US009847834B2

(12) United States Patent
Palmer et al.

(10) Patent No.: US 9,847,834 B2
(45) Date of Patent: Dec. 19, 2017

(54) DIVERGED-BEAM COMMUNICATIONS SYSTEM

(71) Applicants: PALMER LABS, LLC, Durham, NC (US); 8 RIVERS CAPITAL, Durham, NC (US)

(72) Inventors: Miles R. Palmer, Chapel Hill, NC (US); Aleksander Edward Osadzinski, Cary, NC (US); William J. Brown, Durham, NC (US)

(73) Assignees: 8 Rivers Capital, LLC, Durham, NC (US); Palmer Labs, LLC, Durham, NC (US)

(*) Notice: Subject to any disclaimer, the term of this patent is extended or adjusted under 35 U.S.C. 154(b) by 391 days.

(21) Appl. No.: 14/593,149

(22) Filed: Jan. 9, 2015

(65) Prior Publication Data

US 2016/0294472 A1    Oct. 6, 2016

Related U.S. Application Data

(60) Provisional application No. 61/925,889, filed on Jan. 10, 2014.

(51) Int. Cl.
*H04B 10/00* (2013.01)
*H04B 10/112* (2013.01)
(Continued)

(52) U.S. Cl.
CPC ....... *H04B 10/1123* (2013.01); *H04B 7/0617* (2013.01); *H04B 10/116* (2013.01); *H04B 10/503* (2013.01)

(58) Field of Classification Search
CPC . H04B 10/1123; H04B 10/503; H04B 7/0617
See application file for complete search history.

(56) References Cited

U.S. PATENT DOCUMENTS 4,493,114 A * 1/1985 Geller ............... H04B 10/1121
                                                          250/372
5,390,040 A * 2/1995 Mayeux ............. H04B 10/118
                                                          250/234
(Continued)

FOREIGN PATENT DOCUMENTS

| EP | 1158704 | 11/2001 |
|---|---|---|
| WO | WO-2005/089089 | 9/2005 |
| WO | WO2005101704 | 10/2005 |

OTHER PUBLICATIONS

Yasilyev; *The Optoelectronic Swept-Frequency Laser and its Applications in Ranging, Three-Dimensional Imaging, and Coherent Beam Combining of Chirped-Seed Amplifiers*; California Institute of Technology, Pasadena, California; 2013 (177 pages).

(Continued)

*Primary Examiner* — Denny Leung
(74) *Attorney, Agent, or Firm* — Womble Bond Dickinson (US) LLP

(57) ABSTRACT

An apparatus is provided that includes a modulator and an optical transmitter coupled to the modulator and configured to emit an optical beam that the modulator is configured to modulate with data. The optical transmitter may thereby be configured to emit the optical beam carrying the data and without artificial confinement for receipt by an optical receiver configured to detect and recover the data from the optical beam. The optical transmitter may be configured to emit the optical beam with a divergence angle greater than 0.1 degrees, and with a photonic efficiency of less than 0.05%. The photonic efficiency may relate a number of photons of the optical beam detectable by the optical receiver, to a number of photons of the optical beam emitted by the optical transmitter.

26 Claims, 27 Drawing Sheets

(51) Int. Cl.
*H04B 10/116* (2013.01)
*H04B 7/06* (2006.01)
*H04B 10/50* (2013.01)

(56) References Cited

U.S. PATENT DOCUMENTS

| | | | | |
|---|---|---|---|---|
| 5,650,868 | A * | 7/1997 | Rossi | H04B 10/11 375/224 |
| 5,726,786 | A * | 3/1998 | Heflinger | H04B 10/1149 398/121 |
| 5,918,024 | A * | 6/1999 | Moon | H04L 5/18 710/106 |
| 6,025,942 | A * | 2/2000 | Scifres | H04B 10/1149 398/1 |
| 6,314,163 | B1 * | 11/2001 | Acampora | H04B 10/11 379/56.2 |
| 6,414,774 | B1 | 7/2002 | Scifres | |
| 6,522,437 | B2 * | 2/2003 | Presley | H04B 10/1125 398/128 |
| 6,577,421 | B1 * | 6/2003 | Cheng | H04B 10/1125 398/129 |
| 6,643,467 | B1 * | 11/2003 | Presby | H04B 10/1121 385/31 |
| 6,657,783 | B1 * | 12/2003 | Presby | H04B 10/1121 359/399 |
| 6,763,196 | B2 * | 7/2004 | Yafuso | H04B 10/1125 398/121 |
| 6,912,360 | B1 * | 6/2005 | Sparrold | H04B 10/1125 398/118 |
| 7,058,306 | B1 * | 6/2006 | Smith | H04B 10/1121 398/118 |
| 7,120,363 | B2 | 10/2006 | Andreu-von Euw et al. | |
| 7,369,775 | B2 * | 5/2008 | Nikiforov | H04B 10/11 398/118 |
| 7,885,548 | B1 * | 2/2011 | Nelson | H04B 10/1127 398/123 |
| 8,295,706 | B2 * | 10/2012 | Cunningham | H04B 10/112 398/122 |
| 8,467,836 | B2 * | 6/2013 | Noh | H04W 52/0261 307/43 |
| 2001/0043626 | A1 * | 11/2001 | Sakanaka | H04B 10/1127 372/8 |
| 2002/0046763 | A1 * | 4/2002 | Berrios | H02J 7/35 136/244 |
| 2002/0105699 | A1 * | 8/2002 | Miracky | G02B 6/1245 398/56 |
| 2002/0191153 | A1 * | 12/2002 | Wei | A61B 3/024 351/243 |
| 2003/0020992 | A1 * | 1/2003 | Child | H04B 10/1125 398/126 |
| 2003/0228152 | A1 * | 12/2003 | Takahashi | H04B 10/118 398/131 |
| 2004/0120719 | A1 * | 6/2004 | Andreu-von Euw | H04B 10/1127 398/131 |
| 2004/0208597 | A1 * | 10/2004 | Wittenberger | H04B 10/1127 398/130 |
| 2005/0169646 | A1 * | 8/2005 | Bondurant | H04B 10/1121 398/202 |
| 2006/0045144 | A1 * | 3/2006 | Karlsen | G02B 27/0938 372/9 |
| 2008/0008472 | A1 | 1/2008 | Dress et al. | |
| 2013/0223846 | A1 * | 8/2013 | Joseph | H04B 10/11 398/119 |

OTHER PUBLICATIONS

Overton; *Swept-Wavelength Lasers: Akinetic All-Semiconductor Swept Lasers Boost OCT Image Quality*; Laser Focus World; Oct. 14, 2013 (14 pages) website visited Jan. 7, 2015 http://www.laserfocusworld.com/articles/print/volume-49/issue-10/world-news/swept.wavel . . . .
Stotts, et al., *Free Space Optical Communications: Coming of Age*; Atmospheric Propagation V; Proc. of SPIE; 2008; vol. 6951 (15 pages).
Farserotu, et al.; *Scalable, Hybrid Optical-RF Wireless Communication System for Broadband and Multimedia Service to Fixed and Mobile Users*; Wireless Personal Communications; 2003; pp. 327-339; vol. 24; Klewer Adademic Publishers; Netherlands.
Minneman, et al.; *All-Semiconductor High-Speed Akinetic Swept-Source for OCT*; Optical Sensors and Biophotonics III; Proc. of SPIE-OSA-IEEE Asia Communications and Photonics; vol. 8311; 2011 (10 pages).
Kartalopoulos; Free Space Optical Networks for Ultra-Broad Band Services; IEEE; John Wiley & Sons, Inc., pp. 4-7, 38-39, 42-43 and 62-63.
Majumdar et al.; Free-Space Laser Communications, Principles and Advances; Springer, pp. 2-3 and 34-37.
Ghassemlooy et al.; Optical Wireless Communications, System and Channel Modelling with Matlab®; CRC Press, pp. 78-81, 112-115, 348-351, 354-355, 431-433 and 443-445.
Arnon et al.; Advanced Optical Wireless Communication Systems; Cambridge University Press, pp. 24-25, 38-39, 92-95, 118-121, 166-167, 177-181, 242-243, 256-257, and 262-267.
Blaunstein et al.; Applied Aspects of Optical Communication and LIDAR; CRC Press, pp. 4-7, 50-51, 78-79, 172-173, 188-189 and 222-225.
Chadha; Terrestrial Wireless Optical Communication; McGraw Hill Education, pp. 4-5, 20-25, 74-83, 90-93, 106-111 and 198-205.
Hranilovic; Wireless Optical Communication Systems; Springer, pp. 4-5, 14-15, 24-27 and 132-133.
International Search Report and Written Opinion dated Apr. 1, 2015 for International Application No. PCT/US2015/010830.
Joseph Kahn, "Modulation and detection Techniques for Optical Communication Systems", Stanford University, Department of Electrical Engineering, p. CTHC1.

* cited by examiner

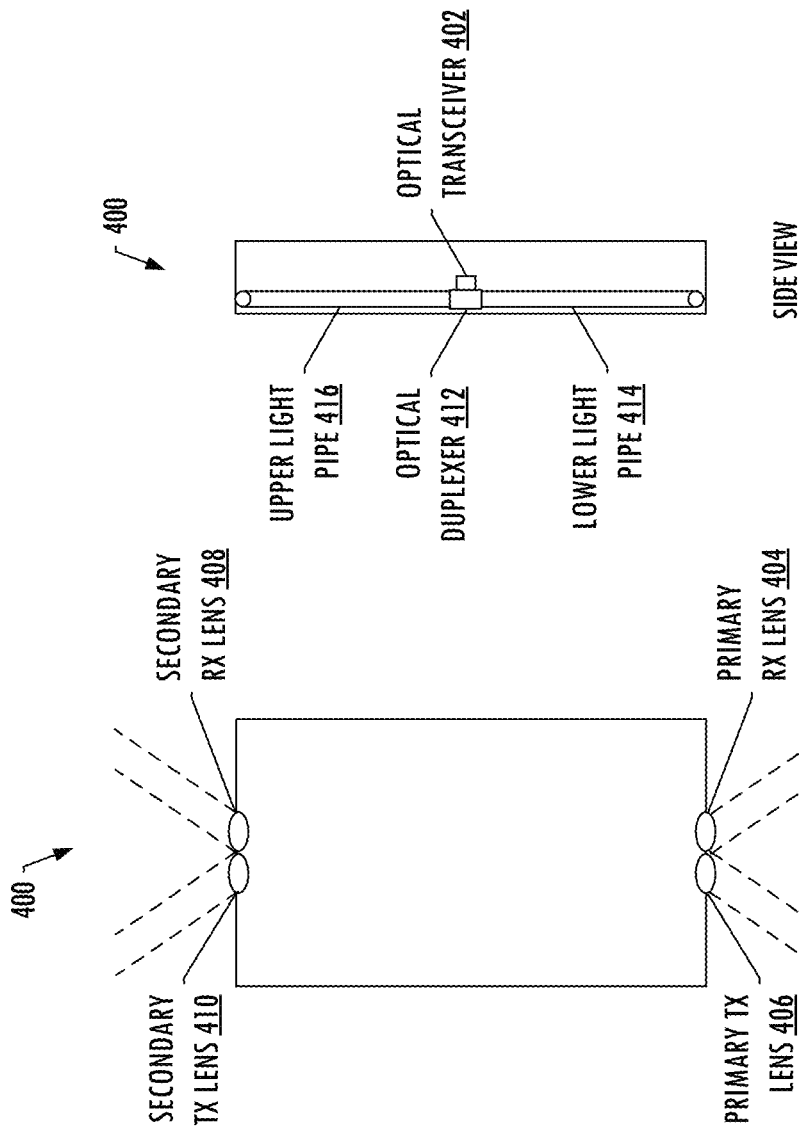

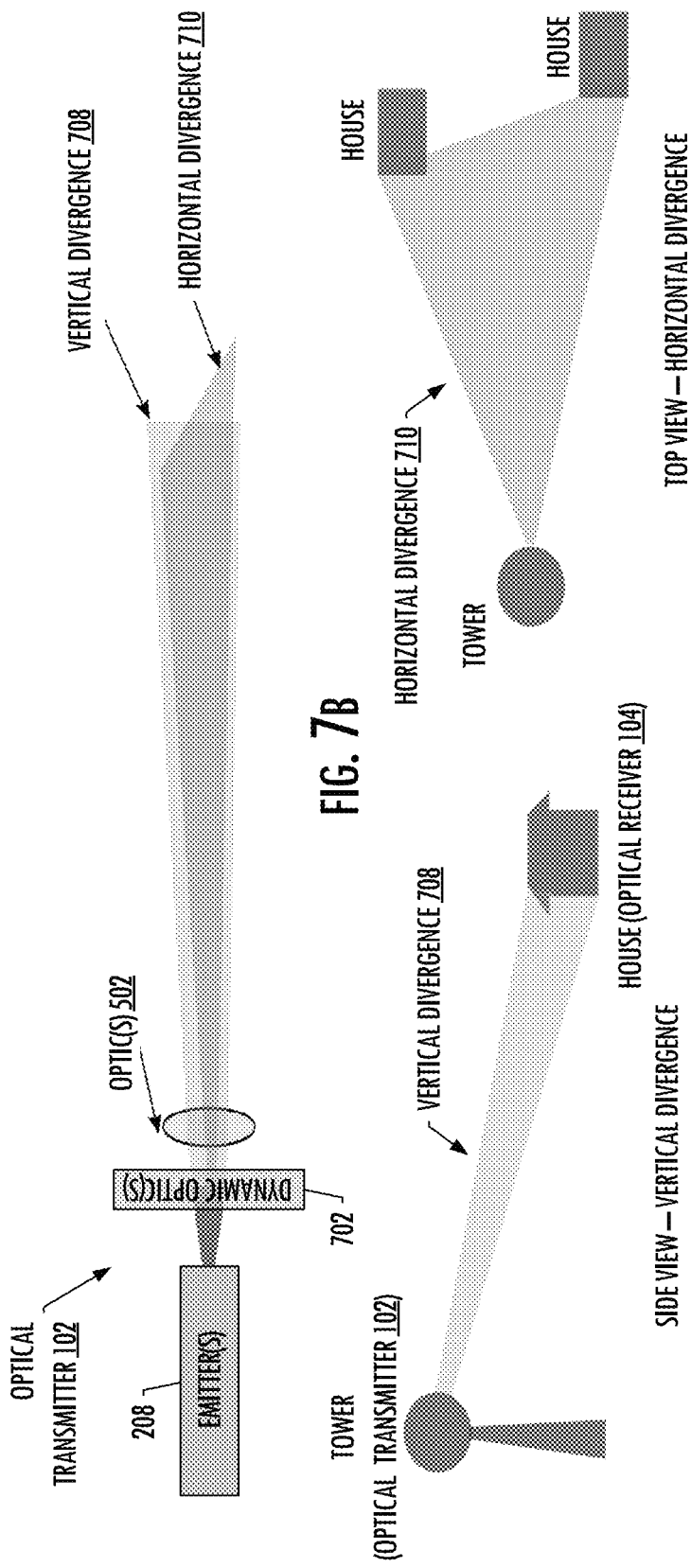

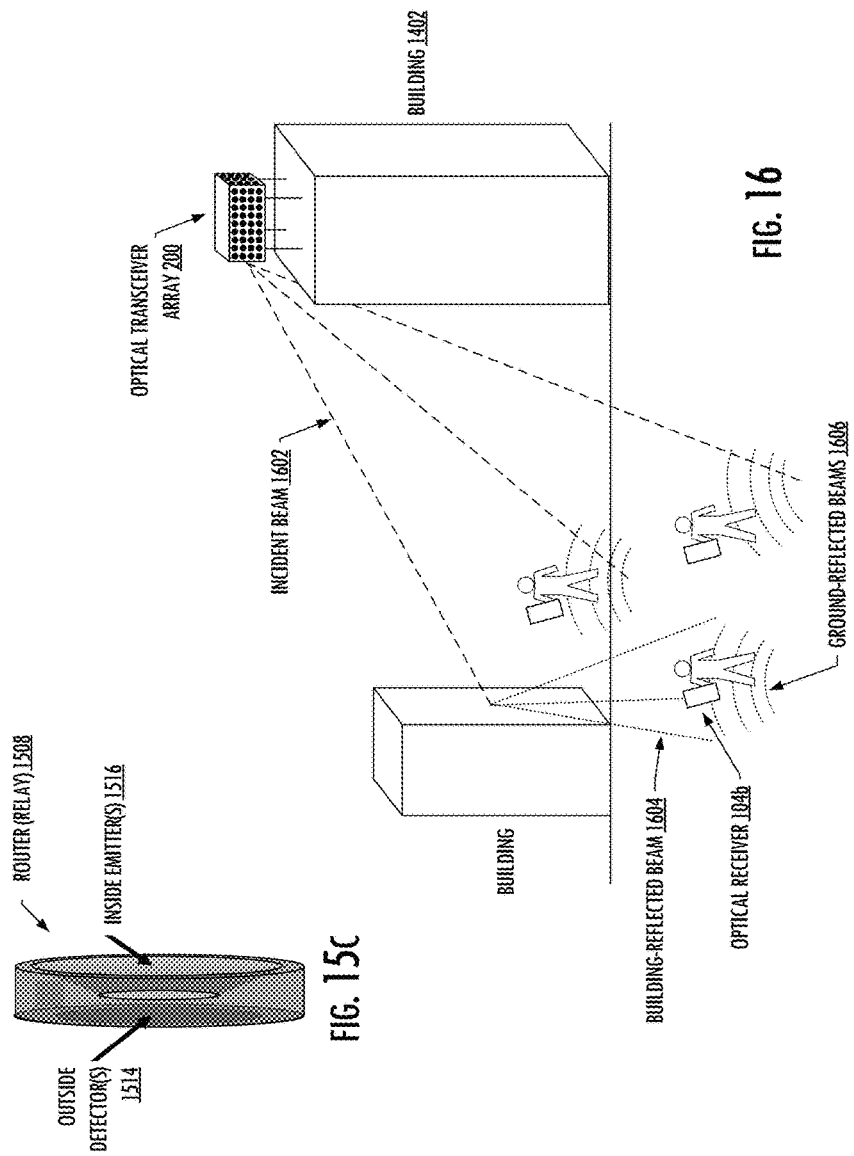

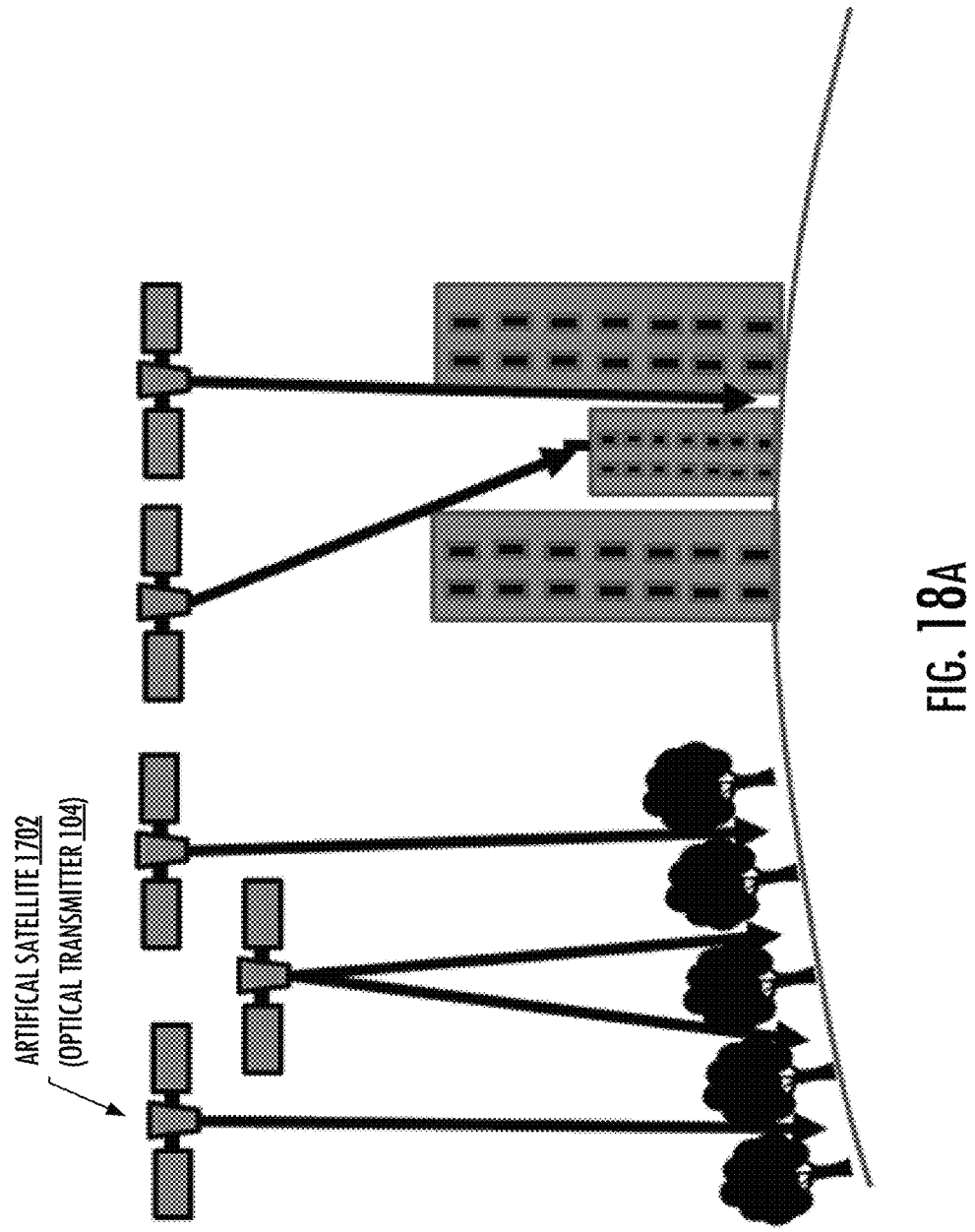

DIVERGED-BEAM COMMUNICATIONS SYSTEM

CROSS-REFERENCE TO RELATED APPLICATION(S)

The present application claims priority to U.S. Provisional Patent Application No. 61/925,889, entitled: Beam Communications System, filed on Jan. 10, 2014, the content of which is incorporated herein by reference in its entirety.

TECHNOLOGICAL FIELD

The present disclosure relates generally to optical communications and in particular, diverged-beam optical communications.

BACKGROUND

The concept of free space optical (FSO) communications using lasers dates back to the invention of the laser. However, difficulties with generating and modulating high-power lasers have restricted the use of FSO to line-of-sight systems using tightly-collimated beams. Very low-power and low-modulation-rate with diverged pulses of light has been used in a few niche applications such as remote controls for televisions and other appliances. Even during the telecom boom of the late 1990's and early 2000's when billions of dollars of investment was made in components and systems, FSO systems did not reach beyond collimated beams in line-of-sight configurations. There are several existing companies selling FSO line-of-sight systems, but these systems require precise alignment and skilled installation. These systems costs start around US $10,000 per link, and only a few thousand systems are shipped per year.

Therefore, it would be desirable to have a system and method that takes into account and resolves at least some of the issues discussed above, as well as possibly other issues.

BRIEF SUMMARY

The present disclosure relates generally to a system and method of FSO communications and in particular, diverged-beam FSO communications. Two converging trends have led to the system and method example implementations of the present disclosure. The first is the exponential rise in the use of and demand for bandwidth, particularly by households and mobile devices. Real-time delivery of video to houses and mobile devices requires massive amount of bandwidth and this will increase with 4K video, video conferencing, over-the-top (OTT) services and other uses. To date this need has been met by cable, digital subscriber line (DSL), fiber to the home (FTTH) and cellular radio technologies for mobile. But available bandwidth is starting to run short in all cases except FTTH, which remains too expensive for deployment to every house and building. The second trend is the decrease in the cost of laser and detector components due both to technology development and to the increased use of photonic components in all types of applications. Advances in components and a drastic increase in market need for bandwidth provide the stage for the system and method of example implementations of the present disclosure.

The starting point for the FSO system of example implementations is the premise that photon creation and detection is on a Moore's law type curve. Laser output powers and detector array sizes and sensitivity are increasing while costs are decreasing. All previous laser-based FSO systems are based on collimated beams with narrow divergence and tight angular tracking of both transmitters and receivers. In contrast, for the system of example implementations, cheap photons can be broadcast over a range of angles and large detectors can accept from a range of angles leading to increased angular tolerance between transmitters and receivers. Multiple beam paths between transmitter and receiver reduce the impact of weather such as rain, fog and snow. Since each bit of information requires some number of photons, cheap photons lead to cheaper bits, which in term lead to more affordable higher bit rate systems. Enough cheap photons lead to non-line-of-sight (NLOS) systems where only a minute fraction of the photons emitted by the transmitter arrive at the receiver, while still being sufficient to achieve very-high bit rates. Optical frequencies mean that there are terabits of bandwidth available for use by the system. The system can solve the last mile and mobile bandwidth market needs by the innovation of diverged laser beam FSO communications.

The present disclosure thus includes, without limitation, the following example implementations:

Example Implementation 1

An apparatus comprising a modulator; and an optical transmitter coupled to the modulator and configured to emit an optical beam that the modulator is configured to modulate with data, the optical transmitter thereby being configured to emit the optical beam carrying the data and without artificial confinement (e.g., in free space) for receipt by an optical receiver configured to detect and recover the data from the optical beam, wherein the optical transmitter is configured to emit the optical beam with a divergence angle greater than 0.1 degrees, and with a photonic efficiency of less than 0.05%, the photonic efficiency relating a number of photons of the optical beam detectable by the optical receiver, to a number of photons of the optical beam emitted by the optical transmitter.

Example Implementation 2

The apparatus of any preceding or subsequent example implementation, or combinations thereof, wherein the optical transmitter being configured to emit the optical beam includes being configured to emit an incident beam directed at a reflector to produce a reflected beam by reflection of the incident beam, the optical transmitter being configured to emit the incident beam for receipt of the reflected beam by the optical receiver.

Example Implementation 3

The apparatus of any preceding or subsequent example implementation, or combinations thereof, wherein the optical transmitter includes an array of emitters configured to emit the optical beam, the array having a size larger than a spot size of the optical beam at the optical transmitter.

Example Implementation 4

The apparatus of any preceding or subsequent example implementation, or combinations thereof, wherein the optical transmitter further includes an optic through which the array of emitters is configured to emit the optical beam, the emitters of the array being configured to emit respective collimated beams but with different angles due to a spatial extent of the array, the array thereby being configured to produce the optical beam composed of the respective collimated beams and whose divergence angle is set by the size of the array and focal length of the optic.

Example Implementation 5

The apparatus of any preceding or subsequent example implementation, or combinations thereof, wherein the optical transmitter further includes an optic through which the array of emitters is configured to emit the optical beam, the array being situated away from a focus of the optic, the emitters of the array being configured to emit respective diverging beams, the array thereby being configured to produce the optical beam composed of the respective diverging beams and whose divergence angle is set by the size of the array and a degree of de-focus due to the situation of the array away from the focus of the optic.

Example Implementation 6

The apparatus of any preceding or subsequent example implementation, or combinations thereof, wherein the optical transmitter is configured to perform multiplexing to serve multiple optical receivers.

Example Implementation 7

The apparatus of any preceding or subsequent example implementation, or combinations thereof, wherein the optical transmitter is configured to emit the optical beam with an adjustable focus or astigmatism, the adjustable focus enabling adjustment of a diameter of the optical beam at a given distance from the optical transmitter, and the astigmatism causing the optical beam to have different vertical and horizontal divergences.

Example Implementation 8

The apparatus of any preceding or subsequent example implementation, or combinations thereof, wherein the apparatus is further configured to transmit a heartbeat signal for orientation of the optical transmitter and optical receiver, the heartbeat signal being modulated to carry or indicate a location of the optical transmitter, or a signal to cause the optical receiver to return its location or an indication of its location to the optical transmitter.

Example Implementation 9

An apparatus comprising a demodulator; and an optical receiver coupled to the demodulator and configured to detect an optical beam that carries data the demodulator is configured to recover, the optical receiver being configured to detect the optical beam emitted and without artificial confinement from an optical transmitter configured to emit the optical beam modulated with the data, wherein the optical receiver is configured to detect the optical beam emitted with a divergence angle greater than 0.1 degrees, and with a photonic efficiency of less than 0.05%, the photonic efficiency relating a number of photons of the optical beam detectable by the optical receiver, to a number of photons of the optical beam emitted by the optical transmitter.

Example Implementation 10

The apparatus of any preceding or subsequent example implementation, or combinations thereof, wherein the optical receiver is configured to detect the optical beam at least in some instances in which the optical receiver does not have a line-of-sight to the optical transmitter.

Example Implementation 11

The apparatus of any preceding or subsequent example implementation, or combinations thereof, wherein the apparatus comprises an array of optical receivers including the optical receiver, or the optical receiver includes an array of detectors configured to detect the optical beam, and wherein optical receivers of the array of optical receivers or detectors of the array of detectors are configured to selectively activate and deactivate (e.g., switch on and off) based on their orientation with respect to (e.g., alignment with) the optical transmitter.

Example Implementation 12

The apparatus of any preceding or subsequent example implementation, or combinations thereof, wherein the optical beam includes an incident beam, and a reflected beam produced by reflection of the incident beam, the optical receiver in at least one instance being configured to preferentially detect the reflected beam, and avoid direct detection of the incident beam.

Example Implementation 13

The apparatus of any preceding or subsequent example implementation, or combinations thereof, wherein the optical receiver includes an array of detectors configured to detect the optical beam, the array having a size larger than a spot size of the optical beam at the optical transmitter.

Example Implementation 14

The apparatus of any preceding or subsequent example implementation, or combinations thereof, wherein the optical beam is spatially multiplexed to serve multiple optical receivers, the array of detectors being arranged in a pattern of detectors that corresponds to a pattern of emitters of the optical transmitter that are independently modulated.

Example Implementation 15

The apparatus of any preceding or subsequent example implementation, or combinations thereof, the apparatus further comprising a wavelength-specific or wavelength-tunable filter to enable the optical receiver to detect the optical beam that is spectral multiplexed to serve multiple optical receivers.

Example Implementation 16

The apparatus of any preceding or subsequent example implementation, or combinations thereof wherein the optical receiver is configured to detect the optical beam with an adjustable focus to facilitate a match of the optical receiver to characteristics of the optical beam, the adjustable focus in at least one instance including focus of the optical receiver at some intermediate point between the optical transmitter and optical receiver.

Example Implementation 17

The apparatus of any preceding or subsequent example implementation, or combinations thereof, wherein the apparatus is further configured to receive a heartbeat signal for orientation (e.g., alignment) of the optical receiver and optical transmitter, the heartbeat signal being modulated to carry or indicate a location of the optical transmitter, or a signal to cause the optical receiver to return its location or an indication of its location to the optical transmitter.

Example Implementation 18

The apparatus of any preceding or subsequent example implementation, or combinations thereof, wherein the optical receiver includes a camera configured to capture a portion of the optical beam, and electronics with which the camera is configured to communicate to drive coarse or fine steering based on the captured portion of the optical beam to at least partially orient (e.g., align) the optical receiver and optical transmitter.

Example Implementation 19

The apparatus of any preceding or subsequent example implementation, or combinations thereof, wherein the optical receiver includes a plurality of photodiodes positioned around a periphery of and that are shadowed by a limiting aperture of the optical receiver, the photodiodes being configured to detect relative powers of the optical beam, the optical receiver further including electronics with which the photodiodes are configured to communicate to drive coarse or fine steering based on the relative powers of the optical beam to at least partially orient the optical receiver and optical transmitter.

Example Implementation 20

A method comprising modulating an optical beam with data; and emitting by an optical transmitter, the optical beam carrying the data and without artificial confinement for receipt by an optical receiver configured to detect and recover the data from the optical beam, wherein the optical beam is emitted with a divergence angle greater than 0.1 degrees, and with a photonic efficiency of less than 0.05%, the photonic efficiency relating a number of photons of the optical beam detectable by the optical receiver, to a number of photons of the optical beam emitted by the optical transmitter.

Example Implementation 21

The method of any preceding or subsequent example implementation, or combinations thereof, wherein emitting the optical beam includes emitting an incident beam directed at a reflector to produce a reflected beam by reflection of the incident beam, the incident beam being emitted for receipt of the reflected beam by the optical receiver.

Example Implementation 22

The method of any preceding or subsequent example implementation, or combinations thereof, wherein the optical beam is emitted by an array of emitters of the optical transmitter, the array having a size larger than a spot size of the optical beam at the optical transmitter.

Example Implementation 23

The method of any preceding or subsequent example implementation, or combinations thereof, wherein the optical beam is emitted by the array of emitters through an optic, the emitters of the array emitting respective collimated beams but with different angles due to a spatial extent of the array, the array thereby producing the optical beam composed of the respective collimated beams and whose divergence angle is set by the size of the array and focal length of the optic.

Example Implementation 24

The method of any preceding or subsequent example implementation, or combinations thereof, wherein the optical beam is emitted by the array of emitters through an optic, the array being situated away from a focus of the optic, the emitters of the array emitting respective diverging beams, the array thereby producing the optical beam composed of the respective diverging beams and whose divergence angle is set by the size of the array and a degree of de-focus due to the situation of the array away from the focus of the optic.

Example Implementation 25

The method of any preceding or subsequent example implementation, or combinations thereof, the method further comprising performing multiplexing to serve multiple optical receivers.

Example Implementation 26

The method of any preceding or subsequent example implementation, or combinations thereof, wherein the optical beam is emitted with an adjustable focus or astigmatism, the adjustable focus enabling adjustment of a diameter of the optical beam at a given distance from the optical transmitter, and the astigmatism causing the optical beam to have different vertical and horizontal divergences.

Example Implementation 27

The method of any preceding or subsequent example implementation, or combinations thereof, the method further comprising transmitting a heartbeat signal for orientation of the optical transmitter and optical receiver, the heartbeat signal being modulated to carry or indicate a location of the optical transmitter, or a signal to cause the optical receiver to return its location or an indication of its location to the optical transmitter.

These and other features, aspects and advantages of the present disclosure will be apparent from a reading of the following detailed description together with the accompanying drawings, which are briefly described below. The present disclosure includes any combination of two, three, four, or more features or elements set forth in this disclosure, regardless of whether such features or elements are expressly combined or otherwise recited in a specific implementation description herein. This disclosure is intended to be read holistically such that any separable features or elements of the disclosure, in any of its aspects and implementations, should be viewed as intended, namely to be combinable, unless the context of the disclosure clearly dictates otherwise.

It will therefore be appreciated that the above Summary is provided merely for purposes of summarizing some example implementations so as to provide a basic understanding of some aspects of the disclosure. As such, it will be appreciated that the above described example implementations are merely examples of some implementations and should not be construed to narrow the scope or spirit of the disclosure in any way. It will be appreciated that the scope of the disclosure encompasses many potential implementations, some of which will be further described below, in addition to those here summarized. Further, other aspects and advantages of implementations disclosed herein will become apparent from the following detailed description taken in conjunction with the accompanying drawings which illustrate, by way of example, the principles of the described implementations.

BRIEF DESCRIPTION OF THE DRAWING(S)

Having thus described the disclosure in the foregoing general terms, reference will now be made to the accompanying drawings, which are not necessarily drawn to scale, and wherein:

FIGS. 4A and 4B illustrate a mobile device that may be equipped with an optical transceiver, in accordance with some example implementations;

FIGS. 7B, 7C and 7D illustrate use of dynamic optic(s) to enable astigmatism in the optical transmitter whereby the vertical divergence may be different than the horizontal divergence, in accordance with some example implementations;

FIGS. 13-17, 18A and 18B illustrate various scenarios in which the diverged-beam communications system may be deployed, in accordance with some example implementations.

DETAILED DESCRIPTION

Figure 1:
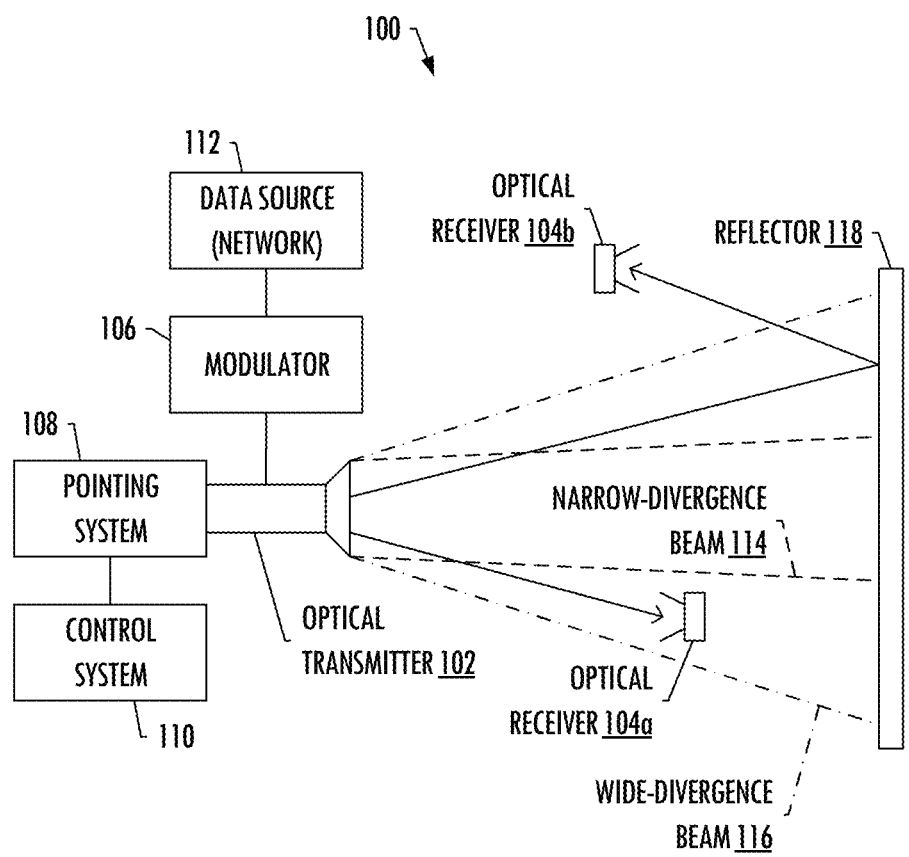
FIG. 1 illustrates a diverged-beam communications system according to various example implementations of the present disclosure.

The present disclosure will now be described more fully hereinafter with reference to example implementations thereof. These example implementations are described so that this disclosure will be thorough and complete, and will fully convey the scope of the disclosure to those skilled in the art. Indeed, the disclosure may be embodied in many different forms and should not be construed as limited to the implementations set forth herein; rather, these implementations are provided so that this disclosure will satisfy applicable legal requirements. As used in the specification and the appended claims, for example, the singular forms "a," "an," "the" and the like include plural referents unless the context clearly dictates otherwise. Also, for example, reference may be made herein to quantitative measures, values, relationships or the like. Unless otherwise stated, any one or more if not all of these may be absolute or approximate to account for acceptable variations that may occur, such as those due to engineering tolerances or the like.

As described hereinafter, example implementations of the present disclosure relate to optical communications, and more particularly diverged-beam optical communications. Example implementations of the present disclosure are primarily described in the context of free space optical (FSO) communications. It should be understood, however, that example implementations may be equally applicable in contexts other than that traditionally associated with FSO communications, that is, communications through air, outer space, vacuum or the like. For example, example implementations may be equally applicable to communications through water or any other liquid, solution or suspension, and any other matter or medium through which an optical beam may propagate without an optical fiber cable, waveguide or transmission line. These and other similar means of artificial confinement may present a contrast in index of refraction that leads to mode confinement therein to carry or otherwise guide an optical beam. Thus, example implementations may be more generally considered applicable to optical communications including the propagation of optical beams between a transmitter and a receiver without artificial confinement such as by optical fiber cable, waveguide, transmission line or the like.

As explained in greater detail below, a diverged-beam communications system of example implementations generally includes an optical transmitter configured to emit a diverging optical beam carrying data, and a receiver configured to detect the optical beam and recover the data from it. The system may be deployed in a number of different scenarios in which the optical transmitter and receiver may equipped by a number of different types of fixed or mobile communications devices and structures configured to transmit and/or receive data, or otherwise support the transmission and/or reception of data. Examples of suitable communications devices and structures include masts, telescopic masts, towers, poles, trees, buildings, balloons, kites, land vehicles (e.g., automobiles, trains), watercraft (e.g., boats, ships), spacecraft (e.g., artificial satellites), celestial bodies (e.g., planets, moons), aircraft (e.g., airplanes, helicopters, unmanned aerial vehicles, dirigibles), computers (e.g., desktop, laptop), tablet computers, smartphones, and any of a number of other types of devices equipped for or otherwise capable of wireless communication.

The diverged optical beam from the optical transmitter and appropriate acceptance angle at the optical receiver mean that the position of the optical transmitter and/or receiver may move while maintaining communications throughput. The speed of motion may be limited by the spot size of the optical beam at the optical receiver, the acceptance angle of the optical receiver and a feedback rate of the optical transmitter and/or receiver tracking. This may be desirable for a number of scenarios, but may also open up additional FSO communications applications that are now either inaccessible or extremely expensive. These include, for example, FSO communications between a ground-based, fixed structure such as a mast or tower and an aircraft. Also enabled is communications between two aircraft. It may also be possible to communicate between spacecraft and a ground-based, fixed structure, in which in some examples the spacecraft may operate in a broadcast mode. Very high-power emitters (e.g., 10 to 1,000's of Watts or more) may be used in some applications.

Another benefit of the diverged optical beam may be its ease of initial alignment and alignment adjustment for what are nominally point-to-point scenarios. One example scenario involves optical communications between two ground-based, fixed structures such as between a tower and building, where the optical transmitter and receiver are initially setup. Simple tracking, either electronically controlled or manual, may facilitate easier setup, minimizing technician time or allowing the end user to set up the equipment. This may also enable ad hoc type networks where the diverged-beam communications system may only be used for a short time and needs to be quickly set up and taken down. Some example potential scenarios include sporting events, fairs or other gatherings where the system combined with Wi-Fi could be used to provide bandwidth to 100's to 100,000's of users with high throughput, less equipment and rapid setup and take down times. Disaster response scenarios may also be supported with rapid deployment of the system in areas where network equipment has been damaged or destroyed. Furthermore, there are numerous military scenarios both for troops and support personnel in areas with active fighting and also in bases and camps where bandwidth needs may change based on number of personnel and amount of equipment. The system may be easily taken down and redeployed as the locations where bandwidth is needed changes over time.

The diverged beam and in some examples a larger acceptance angle at the optical receiver may have a number of benefits over collimated beams when there are scatterers in the beam. For a collimated beam, any scatterer may predominately scatter light out of the beam, and may therefore be just a source of attenuation. Potential scatterers include weather-related scatterers such as rain, snow, ice, hail and fog, as well as non-weather scatterers such as leaves, branches, smoke, wires and others.

In the diverged-beam communications system of example implementations, scattering does not necessarily mean that a photon is lost. In particular, for multiple scatterings there may be photons that may be initially scattered on a path that will take the photons out of the beam path to the optical receiver that may then subsequently be scattered back into the beam path to the optical receiver. This may happen more often in situations where there is significant scattering at angles close to zero forward angle, which is the case for scatters within an order of magnitude of the wavelength of the light, such as fog. In one particular example, droplet size for fog can peak around 2 microns, which may be close to wavelengths of interest for the system in some examples, which may range from 0.4 microns up to 1.6 microns. Just like one can see light from the headlights of a car in foggy conditions well before the car can be seen, the system of example implementations may still receive light in conditions where imaging or collimated beams will be invisible.

Signal degradation for scatterers such as fog may eventually reach the point that the data rate cannot be maintained, at which point the diverged-beam communications system may increase the output power or slow down the data rate or modify its modulation scheme, its error correction scheme, its encoding scheme, its network stack protocols, or any combination of these, to maintain sufficient signal-to-noise ratio (SNR) and/or data integrity. In instances in which the degradation is due to too low photon number or photonic efficiency, then increasing the output power may be sufficient to maintain the data rate. In instances in which the degradation is due to increased multipath dispersion, then the data rate may be lowered. The system may continue to monitor performance and then increase the data rate, lower the output power and/or adjust any of the other of the aforementioned modifications, as conditions improve. The system in some examples may include multiple sets of drive and detection electronics for different data rates. In general, the data rate dynamic range for a given driver may be around one order of magnitude or a factor of 10. Thus one set of electronics may support 1 Gb/s down to 100 Mb/s, but additional electronics may be used for data rates below 100 Mb/s down to 1 Mb/s or even slower. More generally, some example implementations of the present disclosure may support communications at bitrates in the range of megabits per second up to terabits per second or more, and which bitrates may at times be dynamically adjustable using a number of different techniques.

FIG. 1 illustrates a diverged-beam communications system 100 according to various example implementations of the present disclosure. As shown, the system includes one or more of each of a number of components, including an optical transmitter 102 (one shown, and at times referred to as an optical source) and an optical receiver 104 (two shown as optical receivers 104a, 104b, and at times referred to as an optical detector) configured for fixed or mobile communication. In some examples, one or more optical transmitters and receivers may be co-located in the form of one or more optical transceivers. And in some examples, one or more optical transceivers may function as optical relay nodes configured to receive (via its receiver) an optical beam carrying data, and retransmit (via its transmitter) another optical beam carrying the same or similar data. The system of example implementations may therefore include various combinations of one or more optical transmitters, receivers and/or transceivers (some of which may function as relay nodes).

As explained above, the optical transmitters 102, receivers 104 and/or transceivers (including both transmitters and receivers) may be equipped by a number of different types of fixed or mobile communications devices and structures configured to transmit and/or receive data, or otherwise support the transmission and/or reception of data. Examples of suitable communications devices and structures include masts, telescopic masts, towers, poles, trees, buildings, balloons, kites, land vehicles, watercraft, spacecraft, celestial bodies, aircraft, computers, tablet computers, smartphones, and any of a number of other types of devices equipped for or otherwise capable of wireless communication.

The optical transmitter 102 may include one or more emitters, and coupled with appropriate supporting electronics and any appropriate optics, may be configured to emit an optical beam carrying data. The optical receiver 104 may include one or more detectors, and coupled with appropriate supporting electronics and any appropriate optics, may be configured to detect the optical beam and recover the data from it. The optical transmitter and its supporting electronics may be part of an assembly that in some examples also includes a modulator 106, pointing system 108 and/or control system 110. The optical transmitter may be configured to emit an optical beam that the modulator may be configured to modulate with data from a data source 112. The optical receiver may be configured to detect the optical beam that an included demodulator in its associated electronics may be configured to demodulate to recover the data from it. And although shown separately, in some examples, the modulator in some examples may be included in the optical transmitters' associated electronics.

In accordance with example implementations, the optical transmitter 102 may be configured to emit the optical beam such that the beam diverges as it propagates from the optical transmitter. The optical beam may be slightly diverged to produce a narrow divergence beam 114, or more heavily diverged to produce a wide divergence beam 116. A more diverged beam is useful for moving optical receivers 104 such as those equipped by a vehicle or handheld by a user.

Because of the availability of effectively unlimited numbers of discrete channels, and the inherent lack of interference between multiple optical signals, the diverged-beam communications system 100 in more simple example implementations may use on/off keying (OOK) as its primary modulation scheme. This modulation scheme may become insufficient based on any of a number of factors such as increased distance between the optical transmitter 102 and receiver 104, atmospheric conditions, increasing bandwidth requirements, optical transmitter power limitations and the like. The system may manage this insufficiency in a number of different manners such as by using multiple optical transmitters operating at different frequencies, and/or by using additional coding schemes. Suitable examples of additional coding schemes include optical dual binary modulation (ODB), single polarization state phase modulation (DPSK), differential quadrature phase shift keying (DQPSK), and dual polarization quadrature state phase modulation (DP-QPSK).

Errors in data transmission between the optical transmitter 102 and receiver 104 may be controlled in a number of different manners, such as by the use of conventional error-correcting codes and/or forward error correction.

In some examples, the diverged-beam communications system 100 may use any of a number of different techniques to achieve adequate SNR in daylight conditions. Examples of suitable techniques that may facilitate the SNR include the use of high transmission powers, laser line narrowing, narrow bandpass receiver filtering, pseudo-random code modulation, signal averaging, adaptive shading and the like.

In some examples, a single optical transmitter 102 may serve multiple receivers residing within the cone of its optical beam, such as by employing any of number of different multiplexing techniques. Examples of suitable techniques include those based on space, time, frequency (spectrum), polarization, angular momentum, code or some combination of one or more thereof. In more particular examples, conventional channel access methods, such as code division multiple access (CDMA), time division multiple access (TDMA), frequency spacing and the like, may be used. In other examples, spatial division multiple access (SDMA)—three degrees of freedom, angular division multiple access (ADMA)—three degrees of freedom, polarization division multiple access (PDMA)—one degree of freedom, and the like, may be used. The system of example implementations may therefore offer up to ten or more degrees of dimensional separation versus the three degrees available with radio frequencies.

In some examples, the optical transmitter 102 may be configured to encrypt the data before its transmission. Examples of suitable encryption schemes that may be used by the transmitter for this purpose include conventional techniques for high-speed RF networks, such as the KASUMI block cipher or SNOW 3G stream cipher with the UEA1 or UEA2 confidentiality and UIA1 or UIA2 integrity algorithms. The optical receiver 104 may be identified by fixed or removable trust hardware. Alternatively, for example, existing IEEE 802.11 security protocols may be used, especially for purely data, versus voice and data, communications.

In some examples, the optical-beam divergence may be dynamically alterable by an electronically-controlled focusing mechanism at the optical transmitter 102. Among other advantages, this may allow reduced divergence in instances in which the optical beam is locked onto a fixed optical receiver 104, or a mobile receiver that is not expected to move much if at all for at least some portion of the duration of communication between the transmitter and receiver.

In some examples, the power of the optical beam may be electronically alterable by the optical transmitter 102. Among other advantages, this may allow the diverged-beam communications system 100 to conserve energy and/or provide increased safety. In some examples in which the optical beam is locked onto a fixed optical receiver 104, or a mobile receiver that is not expected to move much if at all for at least some portion of the duration of communication between the transmitter and receiver, the beam divergence and/or power may be reduced.

The pointing system 108 may be configured to point the optical transmitter 102 in the general direction of one or more optical receivers 104, such as in accordance with any of a number of different techniques. The pointing system may operate under direction of the control system 110 configured to direct the pointing system to point the optical transmitter in a chosen direction to ensure broad coverage of an area likely to contain one or more receivers. For example, the optical transmitter may transmit a code to one or more possible receivers indicating an availability of service. In an environment such as a city, a set of one or more broad optical beams functioning as a heartbeat signal may be broadcast throughout the city to create an optical underlay that may provide positioning by helping detect the location of one or more receivers and provide appropriate orientation (e.g., alignment) instructions or guidance. In another example, a radio frequency (RF) system may broadcast a heartbeat signal to create an RF underlay and provide control for the diverged-beam communications system 100. As described herein, orientation between the optical transmitter and optical receiver may be primarily described in the context of their alignment. It should be understood, however, that the optical transmitter and optical receiver may be oriented or otherwise positioned in manners other than in what may be considered a traditional alignment, such as in at least some non-line-of-sight (NLOS) cases.

An optical receiver 104 may request service in a number of different manners, such as via a broad optical beams and/or the RF system, providing or indicating its location to the control system 110 (e.g., via GPS or other geolocation method, or using timestamps embedded into the optical communications channels). This and other locations described herein may be represented in any of a number of different manners, such as by a geolocation or a location relative to another component of the diverged-beam communications system 100 (e.g., the location of the optical receiver relative to the optical transmitter 102). The control system may calculate or select an optical transmitter perhaps from a plurality of such optical transmitters, calculate or select the direction in which to point the selected optical transmitter, and steer the selected transmitter to point it in the selected direction using the pointing system 108. In addition, the broad optical beams and/or the RF system may provide guidance as to the location of the optical transmitter, and convey commands to the receiver for appropriate movement to obtain detection, initial acquisition/handshake, and/or to optimize reception.

In some examples, narrow-angle, high-resolution pointing costs may be relatively high, but beam divergence may result in increased laser (optical) costs because of the increased power requirement. As such, there may be a tradeoff between laser costs and pointing costs and an optimum range of operation with a sufficiently high transmission efficiency and moderate laser and pointing costs.

As to pointing costs, current simple tracking systems arranged to provide two-axis motion, such as those used in home security cameras, offer 0.2 degrees of pointing resolution for approximately $20. Current military systems achieve roughly 0.001 degrees of pointing precision for about $5M. In terms of beam divergence, a moderately-powerful laser beam can be diverged to produce a 100 meter spot size at a distance of a few hundred meters to a few kilometers. Beam divergence may be produced using any of a number of different techniques, including beam divergence through optical, mechanical, electro-optical and optical-mechanical techniques, and the like. These techniques can include beam divergence as well as beam steering, either through an aperture or directly.

As an example of one suitable pointing system 108, tracking accuracy of 0.1 degrees can be achieved at a reasonable cost, and an optical transmitter 102 (e.g., laser) producing a sufficiently powerful beam that can travel up to 100 km. In some examples, the performance of the pointing system may be improved through other components such as by adding appropriate optics to either or both the optical transmitter or receiver 104. Examples of suitable optics for this purpose include microelectromechanical systems (MEMS) mirrors, dynamic optics such as steerable liquid lenses, deformable mirrors, and the like. These devices may have a fairly small angular tuning range, for example existing steerable liquid lenses tune +/−0.6 degrees, but may have fine control and relatively low cost. An array of optical transmitters may serve up to 10,000 receivers 104 using such a pointing resolution, and may achieve data rates much superior to current cellular data systems.

In some examples, either or both of the optical transmitter 102 or optical receiver 104 may include respectively an array of optical transmitters or optical receivers (or respectively an array of emitters or detectors—as described in greater detail below). An array of optical transmitters (or emitters) may be arranged in multiple directions, with the array in some examples forming a two-dimensional (2D) or three-dimensional (3D) shape (e.g., cube, sphere, hemisphere). Similarly, an array of optical receivers (or detectors) may be arranged in multiple directions. In these and other similar examples, a pointing system 108 may be omitted with optical transmitters (emitters) or optical receivers (detectors) of a respective array being configured to selectively activate and deactivate based on their orientation (e.g., alignment) with respect to a desired optical receiver or optical transmitter. In some examples, this selective activation and deactivation may be accomplished by the optical transmitters (emitters) or optical receivers (detectors) of a respective array being configured to selectively switch on and off. And in some examples, their orientation may be inferred based on the relative powers of the received optical beams, or according to some other algorithm.

In some deployments of the technology, atmospheric conditions such as fog can be problematic, especially if going completely horizontally through the fog. In one example, a backup long-wavelength infrared (e.g., 8-15 μm) system may be used. In another example, shorter wavelengths may be used at higher power with time gating of the receiver to range gate the photons to only those that travel on a direct or nearly-direct line to the optical receiver 104, which may reduce if not eliminate scattered light and improve SNR. In another example, RF systems may be used as a backup at lower data rates.

In certain scenarios (e.g., tracking a vehicle, mobile device), a wide, highly-diverged beam may be necessary because a narrow beam may not be able to accurately track the optical receiver 104. In these examples, use of reflected beams, with reflections occurring off one or more surfaces such as the sides of buildings, ground surfaces or other surfaces, with those reflections occurring based on use of sufficiently wide and powerful beams. As described herein, references to reflection may refer equally to specular reflection and diffuse reflection or scattering such as that due to Lambertian reflectance.

Direct reception can be accomplished using a direct optical receiver 104a configured to intercept an incident beam. Alternatively, a reflected optical receiver 104b may be used to detect a reflected beam produced from a reflector 118 (including instances of a scattered beam produced from a scatterer). In one example, a single receiver may be configured to serve as either or both a direct receiver and reflected receiver. The receivers can detect the beam and recover the data. Because the beam is diverged, orientation (e.g., alignment) may not be as critical and reception may be obtained in the wide field of the beam, or anywhere the beam is reflected. In some examples, the optical transmitter 102 may direct the optical beam at a reflector or point of reflection on a reflector predetermined to provide an acceptable likelihood of direct or reflected reception by one or more optical receivers. In these and other similar examples, one or more of the optical receivers may (if desired) provide feedback back to the optical transmitter to guide it into a more desired orientation with the respective optical receiver(s).

Turning now more particularly to the optical transmitter 102, in some examples, the optical transmitter may include one or more emitters in the form of one or more at least partially coherent (coherent or partially coherent) lasers configured to emit optical beams of visible, ultraviolet or infrared light. That is, the optical transmitter may be configured to operate and emit optical beams in the visible range (e.g., 400-700 nm), ultraviolet range (e.g., 200-400 nm in wavelength) or infrared range (e.g., 700 nm-1 mm) of the electromagnetic spectrum. In particular examples of infrared light, the optical transmitter may be configured to operate and emit optical beams in the short-wavelength infrared range (e.g., 1.4-3 µm wavelength), or any one or more of the O, E, S, C, L or U infrared bands. Examples of suitable lasers include solid-state lasers, laser diodes, solar lasers and the like. In a more particular example, as explained in greater detail below, the laser may be a vertical cavity surface emitting laser (VCSEL).

In some examples, the optical transmitter 102 may be composed of one or more fixed-frequency or tunable lasers. In either case, by either deploying multiple fixed-frequency lasers with different frequencies, or tuning multiple tunable lasers to different frequencies, the diverged-beam communications system 100 may employ multiple discrete frequencies. In some examples, the system may operate over a range of frequencies as broad as 500 THz, with a per-channel bandwidth of from 0.1 MHz to 1000 MHz, which may provide between 500,000 and 5,000,000,000 discrete channels of operation.

Figure 2A:
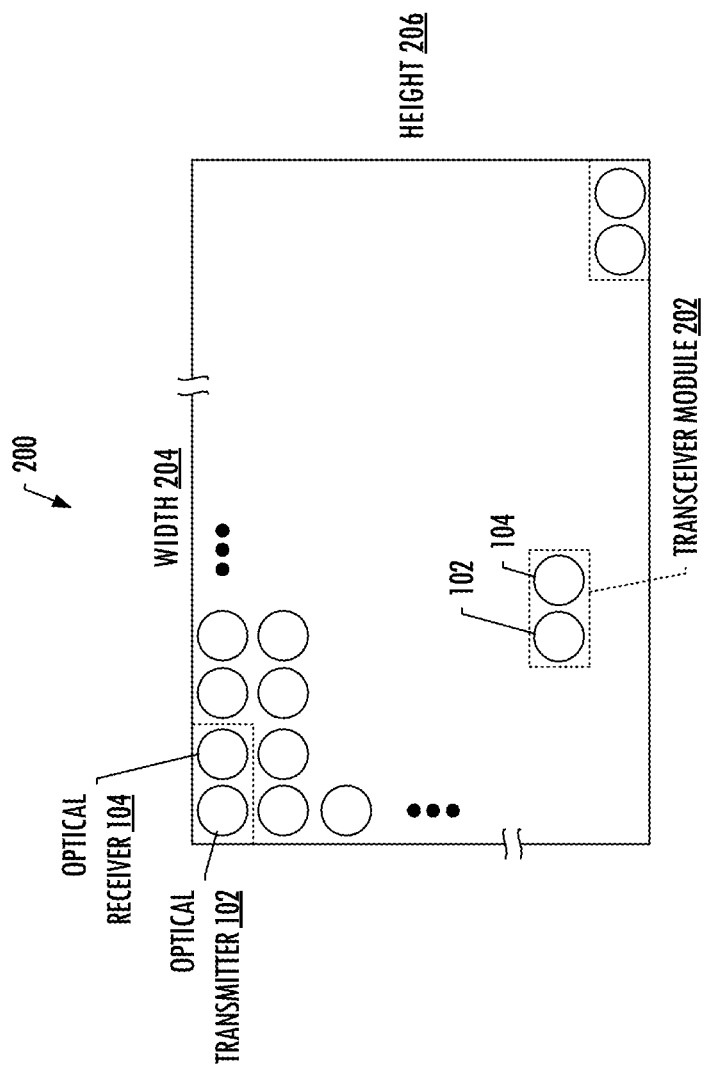
FIG. 2A illustrates an optical transceiver array including a plurality of optical transceivers (sometimes referred to as transceiver modules), according to various example implementations.
Figure 2B:
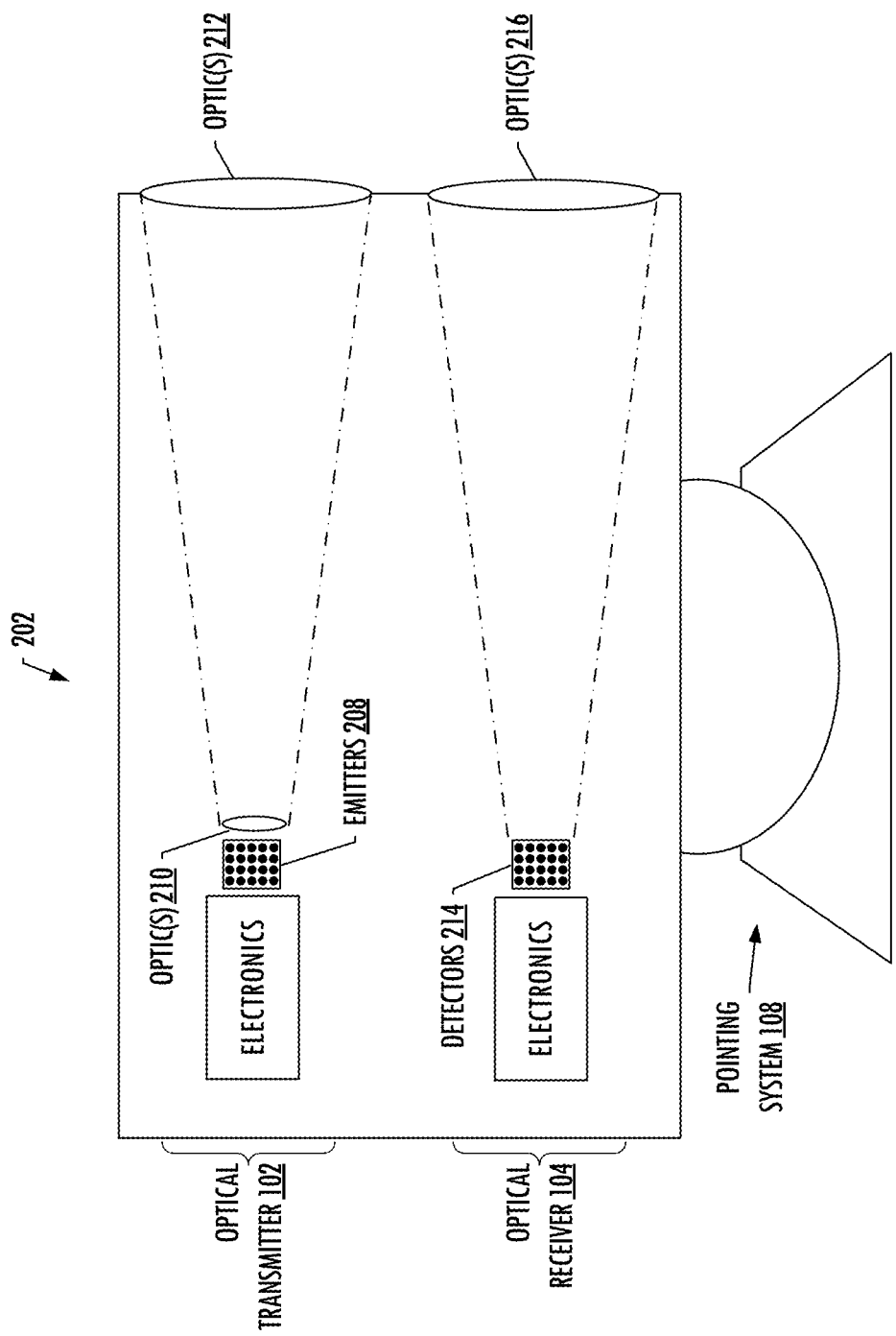
FIG. 2B illustrates a transceiver module in further detail, in accordance with some example implementations.
Figure 2D:
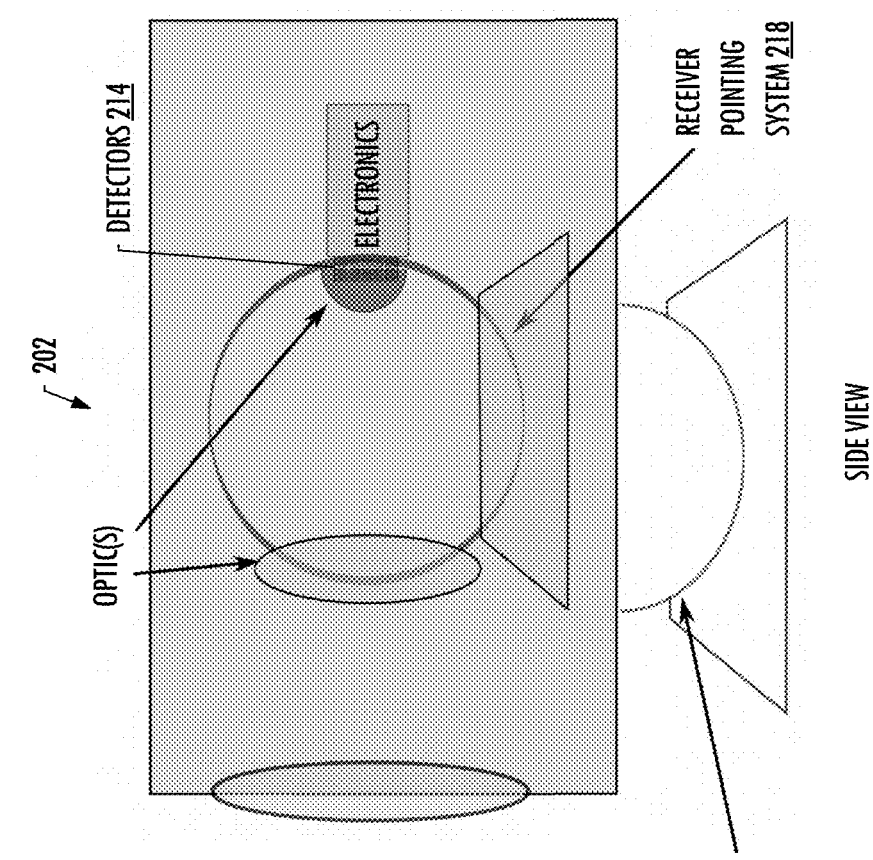
FIGS. 2C and 2D illustrate a transceiver module and highlight a pointing system thereof, in accordance with some example implementations.
Figure 2C:
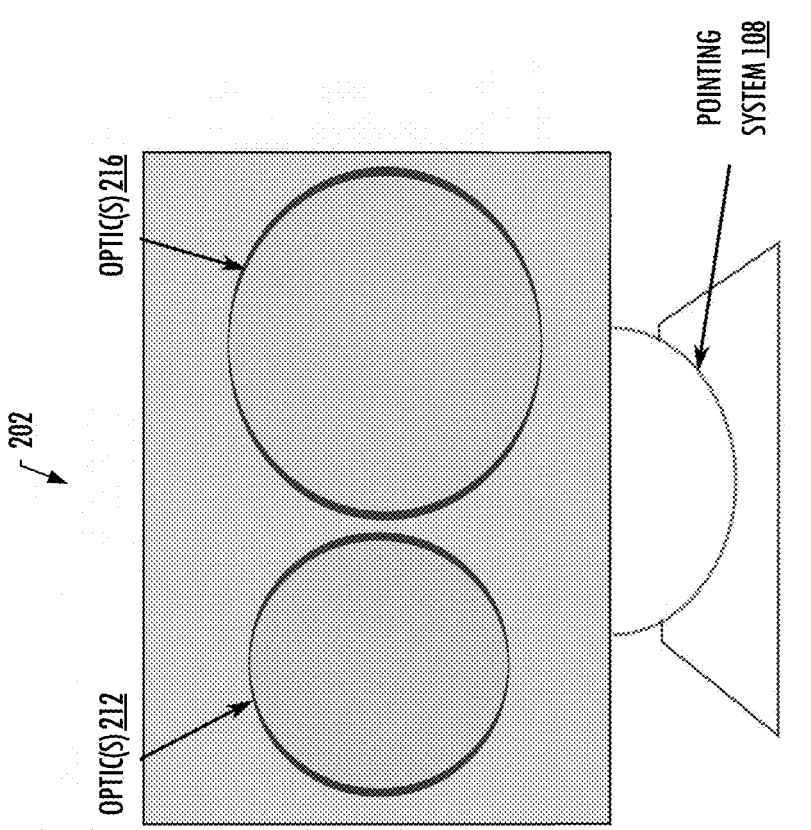

FIG. 2A illustrates an optical transceiver array 200 that in some examples may correspond to a plurality of optical transceivers 202 (sometimes referred to as transceiver modules) each of which includes an optical transmitter 102 and receiver 104, and an example of which is shown in greater detail in FIG. 2B. As shown, the transceiver array may have a suitable number of cells along its width 204 as well as it height 206. In one example, the transceiver array may include m×n transceiver modules with m=70 and n=30. In one example, the diameter of the optics (e.g., apertures) on each of the transmitter and receiver in the transceiver module may be 3-4 inches, resulting in rectangular transceiver of approximately 4-5 inches high and 7-8 inches wide. In other examples, larger or smaller optics may be used. Larger optics may be generally associated with longer connection ranges. The optics may be of many types, including low-cost molded plastic lenses, Fresnel lenses, mirrors and the like. Further, other shapes besides the square or rectangular shape shown may be used for the transceiver array. In one example a triangular structure may be used, while in another example an octagonal structure may be used. In other examples, as shown in FIG. 2C, existing network infrastructure, such as cell towers, may be used regardless of their geometry.

FIG. 2B illustrates a transceiver module 202 in further detail, in accordance with some example implementations. As shown, for example, the transceiver may include an optical transmitter 102 with one or more emitters such as one or more laser diodes (an array of emitters 208 being shown for example). One or more optics 210, 212 (e.g., one or more lenses, mirrors) may be used to spread a collimated beam from the emitters, and refocus the beam and produce a relatively broad and partially collimated (e.g., diverged) optical beam. In another example, the optic(s) may be configured to converge a collimated beam from the emitters to a point between the optical transmitter and optical receiver 104, at which point the beam may be spread for receipt by the optical receiver.

As also shown, the transceiver module 202 may contain an optical receiver 104 with one or more detectors such as one or more PIN photodiodes, avalanche photodiodes (APDs), photomultiplier tubes (PMTs) or the like (an array of detectors 214 being shown for example). The receiver may be used to detect an incoming optical signal, and one or more optics 216 (e.g., one or more lenses, mirrors) may be used to focus incoming light onto the receiver. A pointing system 108 such as a pan-and-tilt control may be used to move both the optical transmitter and receiver and aim them at the appropriate areas.

The pointing system 108 may be generally configured to point the transceiver module 202. In some examples, however, the optical transmitter 102 or receiver 104 may be pointed independent of the other. As shown in FIGS. 2C and 2D, in some examples, the pointing system may further include a receiver pointing system 218 configured to specifically point the optical receiver. As also shown, in some examples, the receiver pointing system may be located within the transceiver module. A receiver pointing system may allow alignment of the optical receiver to an incoming beam to optimize the signal. The beam may carry data, or as explained below, may carry a heartbeat.

Figure 3:
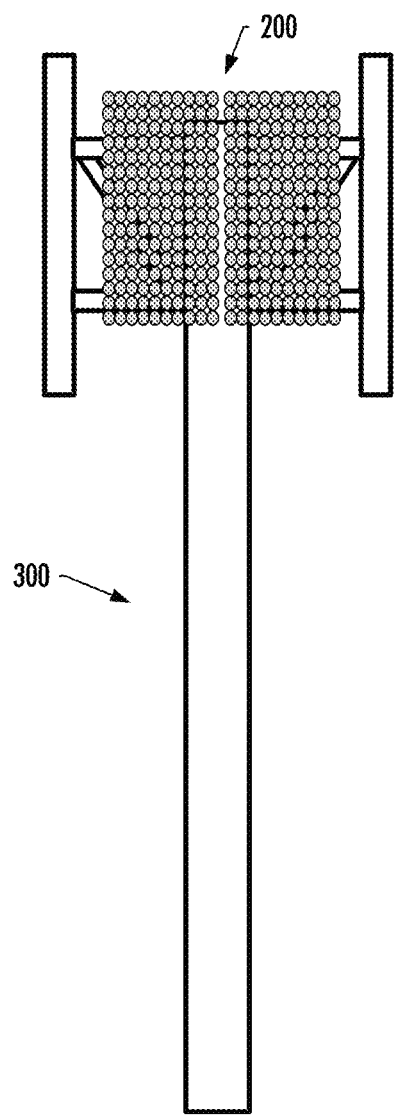
FIG. 3 illustrates an optical transceiver array retrofitted to existing network infrastructure such as a cell tower, in accordance with some example implementations.

FIG. 3 illustrates one or more optical transceiver arrays 202 retrofitted to existing network infrastructure 300 such as a cell tower. In a scenario such as that shown in FIG. 3, each transceiver array may provide 120° of coverage, and three arrays may provide 360° of coverage. Or in some examples, a single transceiver array may be configured to provide 360° of coverage, such as by an array arranged in multiple directions forming a 3D shape. These arrays may include a wide range of numbers of optical transmitters 102 and receivers 104, from under ten to hundreds, to thousands and up to a million or more. In some examples, each user may be rapidly switched between the optical transmitters and receivers, which may facilitate safe operation of the system.

FIGS. 4A and 4B illustrate a mobile device 400 such as a smartphone that may be equipped with an optical transceiver 402 including an optical transmitter 102 and receiver 104, in accordance with some example implementations. As shown, the mobile device may include one or more upper and lower transceiver optics (apertures) in order to be able to receive an appropriate reflected beam. In the example shown, a primary receive lens 404 and primary transmit lens 406 may be located at the bottom of mobile transceiver, and a secondary receive lens 408 and secondary transmit lens 410 may be located at the top of the mobile device. In one example, an optical duplexer 412 may be used in conjunction with a lower light pipe 414 and an upper light pipe 416 to guide the light appropriately from either the primary or secondary lenses to the optical transceiver.

In some examples, the mobile device 400 may be an existing, retrofitted mobile device, or manufactured as an integrated mobile device. The mobile device of some examples may combine GPS location and device orientation with knowledge of an optical transmitter 102 or an optical relay node to enable the mobile device to initiate or respond to initiation of transmit-receive handshake protocols to optimize an optical link between the optical transmitter/ optical relay node. The mobile device in some examples may include a digital interface, receiver optics with steerable sunlight shading, laser transmitter/modulator, beam director and receiver/demodulator.

Figure 5A:
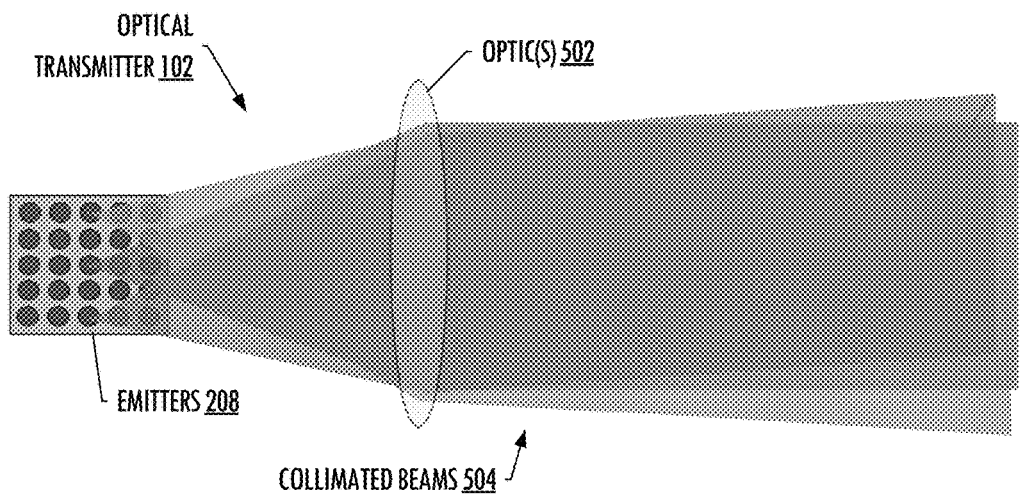
FIGS. 5A and 5B illustrate example techniques for achieving beam divergence using an extended source of an array of emitters, in accordance with some example implementations.
Figure 5B:
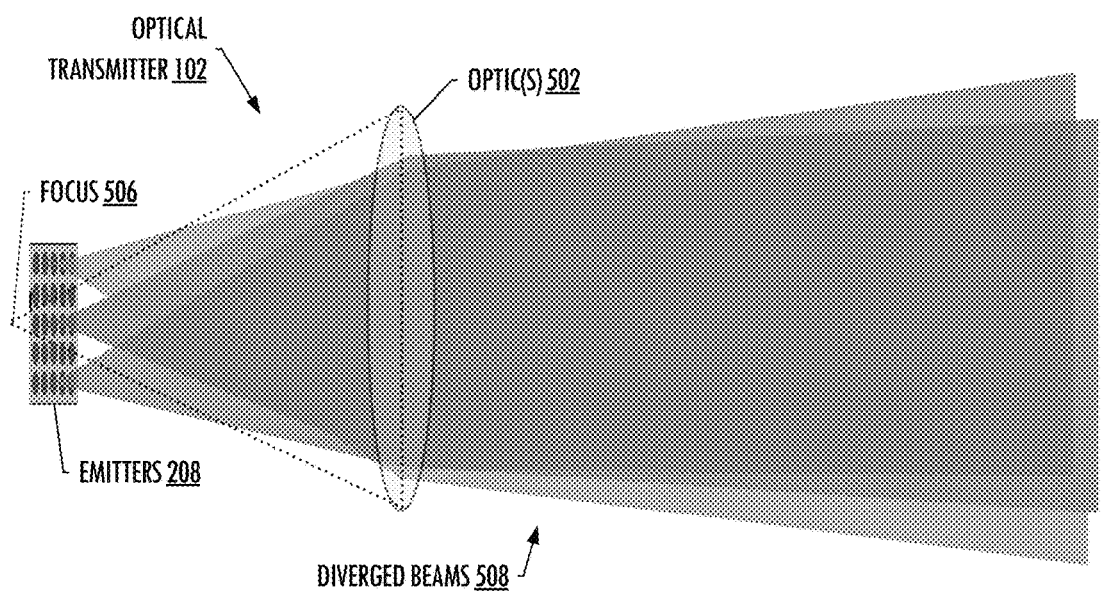

As indicated above, beam divergence in the diverged-beam communications system 100 may be produced using any of a number of different techniques. In one example, a point source emitter such as a laser diode or an optical fiber may be used in the optical transmitter 102, and a diverged beam may be generated by the use of appropriate optics such as concave lenses, convex mirrors or convex lenses where the light source is not at the focus. FIGS. 5A and 5B illustrate example techniques for achieving beam divergence using an extended source of an array of emitters 208 such as VCSELs, where the extended source is larger than the spot size of the optical beam at the optical transmitter. As shown in FIG. 5A, the transmitter with the extended source may be placed at the focus of one or more optics 502 (e.g., optics 210, 212). The emitters of the array may emit respective collimated beams 504 but with different angles due to the spatial extent of the array. This may produce an overall diverging beam whose divergence angle may be set by the size of the array and focal length of the optics.

As shown in FIG. 5B, the array of emitters 208 may be situated closer to or farther from the optics 502, and thereby away from its focus 506, to increase the degree of divergence. In this situation, the emitters may emit respective diverged beams 508, again with different angles. The divergence angle in this situation may be set by the size of the array and degree of de-focus due to the situation of the array away from the focus of optics.

In another example, the transmitter 102 may use a source emitter with an inherent divergence that is close to the desired system divergence. For example, the divergence angle of VCSEL lasers may be less than the divergence of edge-emitting laser diodes and may approach the divergence needed by the system. In this case, no additional optics may be needed. It should be noted that some combination of the aforementioned approaches may also be used to achieve the desired system beam divergence. It should also be noted that it may be advantageous for the divergence in the vertical and horizontal directions to be different.

A transmitter 102 with an extended source of an array of emitters may also lead to different power limits for desired operation, which in some examples may at least in part relate to eye safety. Most laser power limit calculations are predicated on a collimated beam where the light can be focused to a very small point, on the order of 20 microns. In the far field, this may be the correct limit for the extended source, since it will appear to be nearly a point source. In the far field, the diverged-beam communications system 100 may already be below a desired power limit since the beam is diverging. In the near field, closer to the transmitter, however, the power level may be greater than the desired power limit for collimated beams. The extended nature of the source emitters may increase this limit since an extended source may not be focused to a single spot, but rather may be focused to an area. This limit may depend on the beam divergence and distance between the transmitter and to where the emitters are focused, but may increase the desired power limit. In turn, this may simplify system design and reduce cost if some or all of the power limit monitoring is not needed.

Although the transmitter 102 may employ any of a number of different types of emitters, VCSEL arrays are a particularly suitable example of a type of emitter that may also naturally lead to extended sources. A VCSEL array has an array of individual diodes that may be wired in parallel, which may lead to a higher than desirable input capacitance for high frequency high data rate applications. One current 2 W VCSEL array has approximately 1000 diodes in parallel each with a nominal 0.4 pF capacitance, which produces an input capacitance of 400 pF. In some examples, the wiring may be reconfigured to power the VCSEL array as 10 different sub-arrays connected in a parallel configuration, each of the arrays having 100 diodes and thus a capacitance of 40 pF. The connected sub-arrays may be driven using 10 separate amplifier modulators each driving 40 pF.

In another example, the wiring may be reconfigured to connect the 10 sub-arrays in a series configuration, which may reduce the capacitance to 4 pF (40 pF/10) and allow driving all 1000 diodes with a single amplifier modulator, eliminating problems of synchronizing and phasing the multiple amplifiers. The driving voltage for the series configuration may also be increased tenfold, which may increase the efficiency of driving the array since it can be easier to drive a higher voltage load at lower current than a lower voltage load at higher current. Power losses may also be decreased.

In accordance with example implementations, then, an array of emitters such as VCSELs may be arranged in various parallel and/or series configurations to optimize the electrical design from both the maximum data throughput rate and power efficiency points of view. The electrical drive waveform may also be tailored to minimize the impact of turn-on and/or turn-off overshoot or oscillations due to relaxation resonances, off-state bounce and other effects. The waveform may depend on how many individual VCSELs are in series or parallel or some combination thereof.

In addition to the above, VCSELs may provide a number of other benefits to example implementations of the present disclosure. VCSELs may be easier to directly modulate since each laser element inherently has a short cavity. Direct modulation may lead to simpler and less expensive system design. The higher reliability of each laser along with the parallel nature of the array may lead to very high system reliability and long MTBF (mean-time-between failures). Even if a few lasers within the array fail, the overall decrease in power may be minimal. The extended nature of the VCSEL array and high efficiency may minimize issues of heat generation and transport out of the array. Both of these may be important for high bandwidth, low cost FSO systems.

VCSEL arrays may also include a larger number of elements per array, higher overall output power and higher modulation bandwidth. VCSELs are typically quite efficient, above 40% in some cases. In some examples, the same array may include VCSELs with multiple wavelengths, and an array may include independently-controlled or modulated subsections. The available wavelengths may also expand. Currently most VCSEL arrays are between 800 nm and 900 nm, but wavelengths may become available over the visible range of 400 nm up to 800 nm as well as some of the more typical telecom wavelengths including around 1310 nm and around 1550 nm. Part of the VCSEL array may operate as the heartbeat (explained in greater detail below) where it may be modulated at a much slower rate than a data portion of the array and generate a desired power level.

Turning now to the optical receiver 104, a number of communication systems have used fairly small PIN photodiodes or APDs, which may be suitable in some example implementations. The small size enables high bandwidth and also matches the core size of fiber optics, which ranges from ~5 microns up to 200 microns or more. In accordance with example implementations, the beam may be centimeters to many meters across at the detector, which may benefit from the collection of photons from an aperture that is a centimeter up to many centimeters across. This may be accomplished with optics, such as lenses, mirrors and the like, but there may be a trade-off between the acceptance angle and the aperture size. This may be mitigated by using an optical receiver with a larger detector. The detector may be as large as the collection aperture, and the optical receiver may not have any optics. In another example, the optical receiver may include a very large area detector and only have optical filtering in front of the detector, or may have microlenses in front of individual detectors that make up a detector array.

Figure 6A:
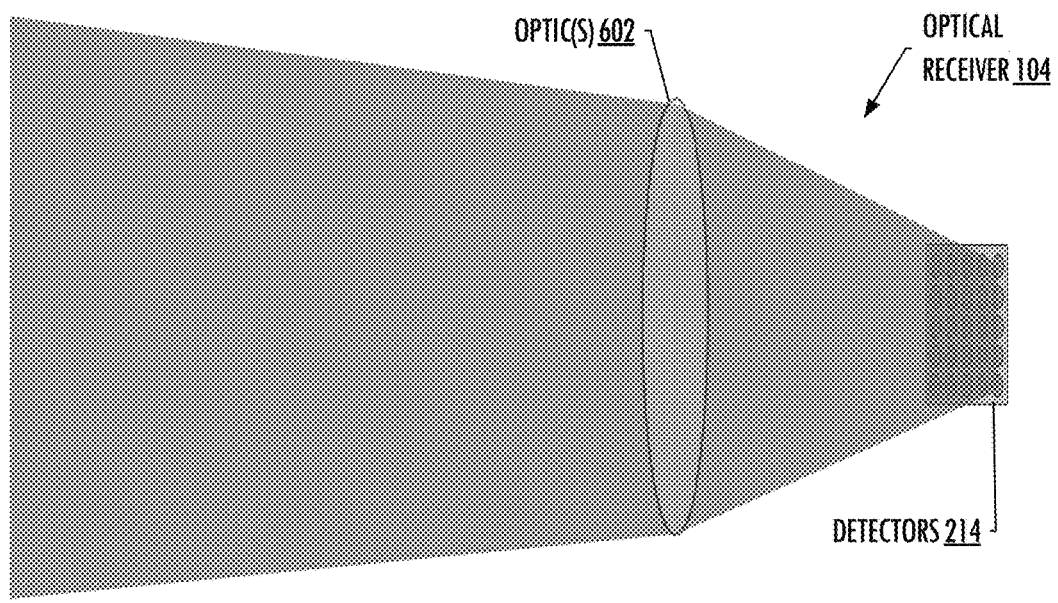
FIGS. 6A and 6B illustrate optical receivers in accordance with example implementations.

FIG. 6A illustrates an optical receiver 104 in accordance with one example implementation of the present disclosure. As shown, similar to the optical transmitter 102, the optical receiver may include an extended source of an array of detectors 214 and one or more optics 602 (the array of detectors having a size larger than the spot size of the optical beam at the optical transmitter). An array of detectors may have advantages similar to an array of emitters at the optical transmitter. For example, by building a detector based on many small detectors, the overall system bandwidth may remain quite high. Likewise if a few detectors fail, the impact on the overall system performance may be reduced.

Figure 6B:
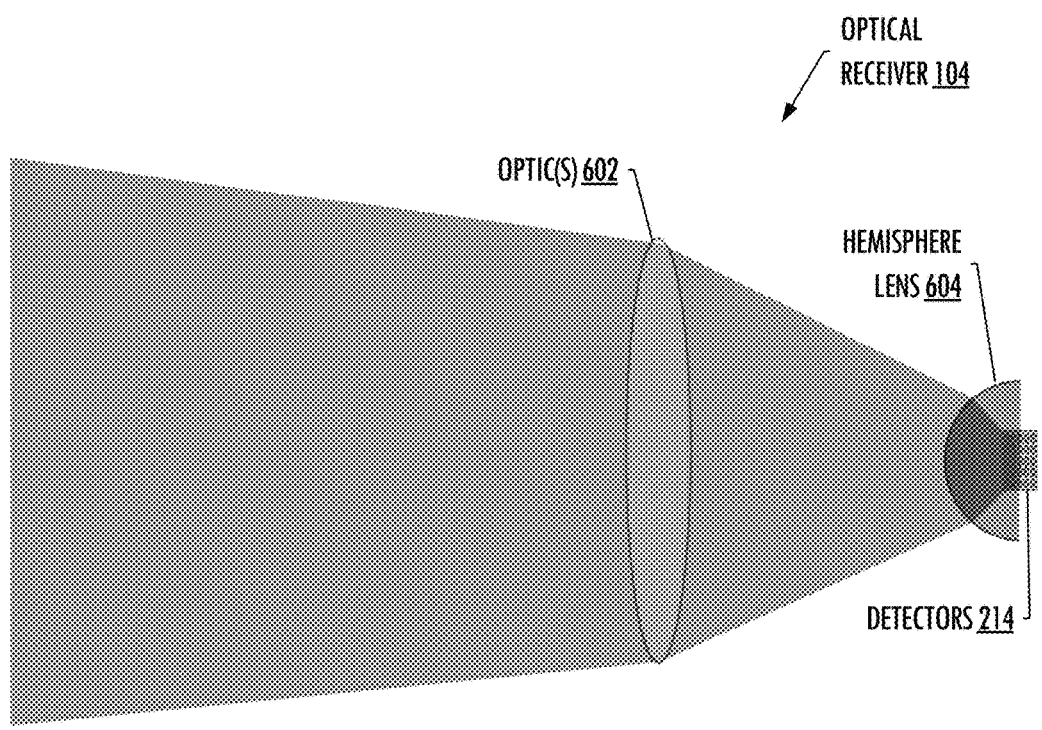

FIG. 6B illustrates a similar optical receiver but further including one or more optics such as one or more hemisphere lenses 604 of a high-index material, such as ruby, sapphire, or some plastics or glasses, place in close proximity to the array of detectors 214 to increase the optical gain. This increase may go as the square of the index of refraction of the material. Shown as a single lens right in front of the array of detectors, in some examples, the lens may instead be an array of microlenses over respective detectors of the array of detectors, which may reduce the impact of fill factor on the array. These microlenses may be formed and arranged to cover as much area as possible over and between detectors in the array of detectors.

In the case of an array of detectors 214 with additional optics, the acceptance angle of the optical receiver 104 may be as high if not much higher than previous FSO systems since the optical gain does not need to be as large to maintain the same or similar optical aperture. As size of the detector increases from 200 microns up to 500 microns, and then to 1 mm and more, the acceptance angle may increase from a fraction of a degree up to several degrees, while maintaining an aperture size of 0.1 to 100 or more centimeters.

Briefly returning to FIG. 1, in some examples, the diverged nature of the optical beam and the changing conditions in non-line-of-sight (NLOS) cases may be improved by having adjustable focus, astigmatism and/or pointing adjustment in the optical transmitter 102 and/or receiver 104, which may be implemented in any of a number of different manners. In some example implementations, the optical transmitter 102 and/or receiver 104 may include one or more dynamic optics that may be configured to enable one or more of the aforementioned adjustable focus, astigmatism or pointing adjustment. These dynamic optic(s) may include one or more surfaces that may change over time, and that in some examples may be electrically controlled. Examples of suitable dynamic optics included liquid lenses, deformable mirrors and the like. More particular examples include liquid lenses manufactured by Varioptic or Optotune. Liquid lenses in particular are generally designed for imaging applications such as cell phone cameras, but may be adapted for the diverged-beam communications system 100. They are relatively small and low cost and may be operated by a voltage or current across a membrane in the device. There are also liquid lenses with astigmatism available, such as the Visayan from Varioptic.

Figure 7A:
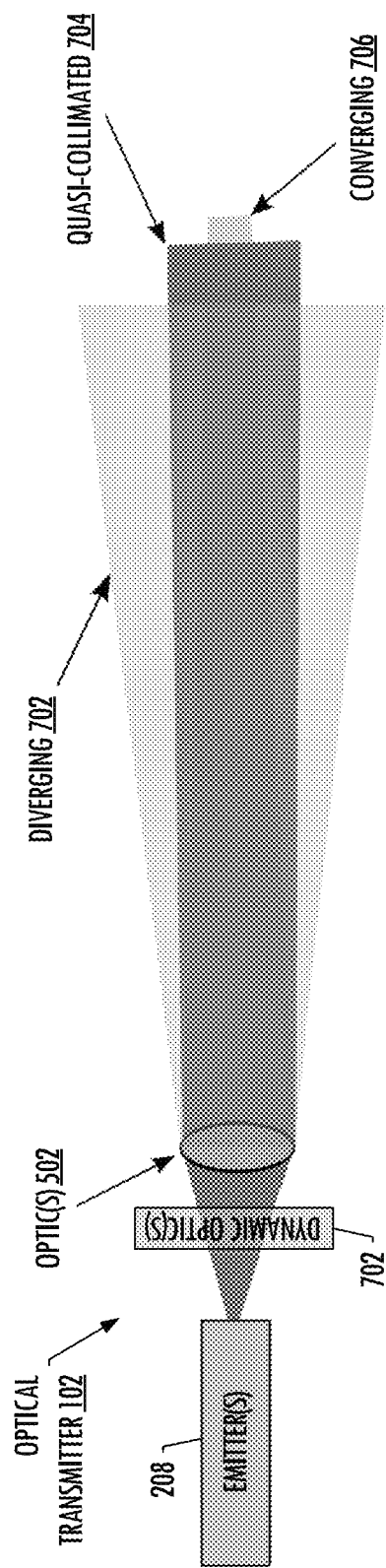
FIG. 7A illustrates an optical transmitter including one or more dynamic optics configured to enable an adjustable focus of the optical beam, in accordance with some example implementations.

FIG. 7A illustrates an optical transmitter 102 including one or more dynamic optics 702 configured to enable an adjustable focus of the optical beam. For the optical transmitter, an adjustable focus may enable adjustment of the beam diameter at a given distance from the optical transmitter, from diverging 702 to quasi-collimated 704 to converging 706. For example, in a short range setup of 100 m up to 1 km, it may be desirable to increase the beam divergence so that the power level is below the desired power limit over as much of the beam path as possible. Conversely, in instances in which the beam is to travel more than 1 km, up to 10 km or more, it may be desirable to decrease the beam divergence so that the power level at the receiver stays above the threshold required for a given data rate. Likewise, in some weather conditions such as fog, it may be desirable to decrease the beam divergence since there may be additional beam divergence generated by the scattering of the fog.

FIGS. 7B, 7C and 7D illustrate use of dynamic optic(s) 702 to enable astigmatism in the optical transmitter 102 whereby the vertical divergence 708 may be different than the horizontal divergence 710 (focusing in the vertical axis is different than in the horizontal axis). This may be desirable in cases such as a tower-to-ground scenario where horizontal beam spread may be more than the vertical beam spread. The optical receiver 104 may be within a few meters of the ground vertically, but anywhere within tens or hundreds of meters horizontally particularly at distances of 1 km or more from the tower.

Figure 7E:
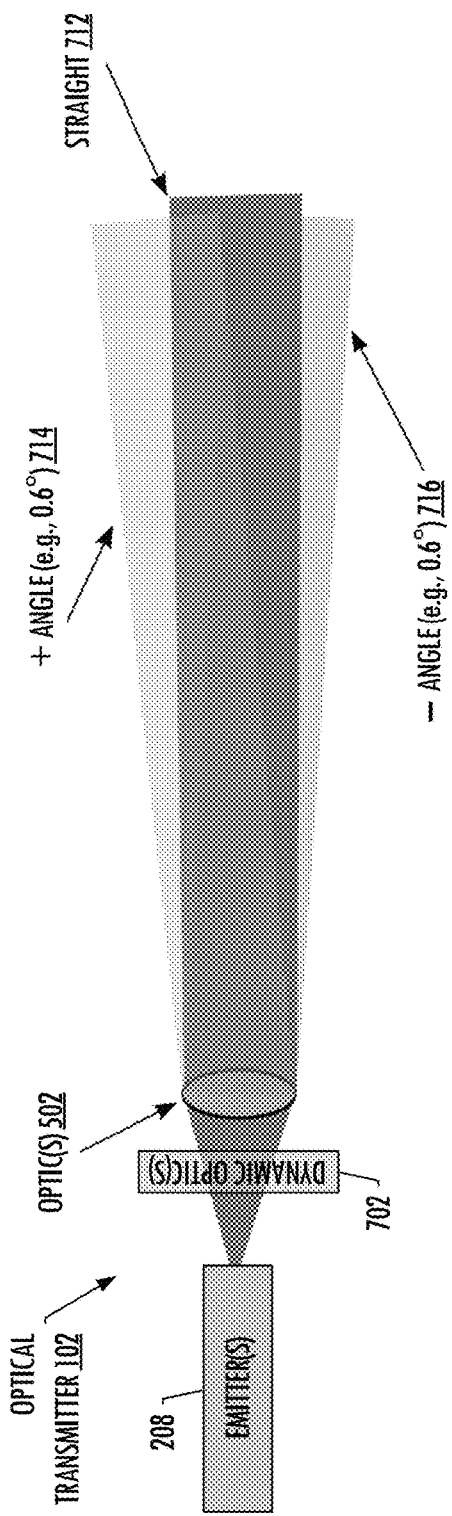
FIG. 7E illustrates use of dynamic optic(s) to enable pointing adjustment at the optical transmitter, in accordance with some example implementations.

FIG. 7E illustrates use of dynamic optic(s) 702 to enable pointing adjustment at the optical transmitter 102. As explained above in the context of the pointing system 108, the dynamic optic(s) may enable tuning the optical beam from straight 712 to +/−0.6 degrees 714, 716, although it should be understood that larger or smaller angles are possible. In some examples, this may allow and adjustment resolution of ~8 bits or 256 counts (1.2 degrees/256=80 micro-radians of resolution).

Figure 8:
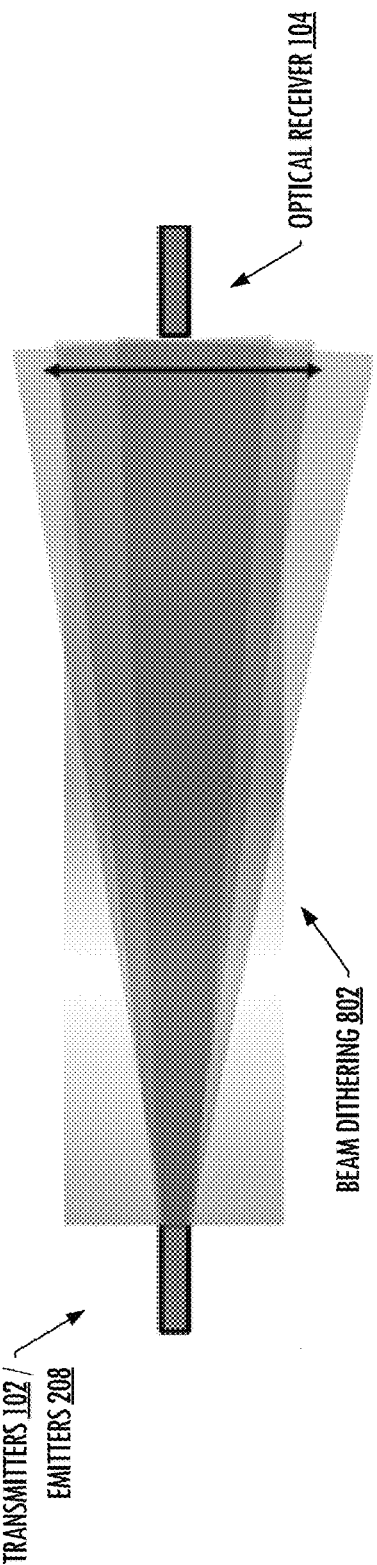
FIG. 8 illustrates beam dithering according to some example implementations.

As shown in FIG. 8, in some examples, the diverged-beam communications system 100 and method of example implementations may support multiple beams from a single transmission point, such as from an array of multiple optical transmitters 102, or a transmitter with an array of emitters 208, which may support rapid beam dithering 802. This beam dithering may then in turn be used to mitigate scintillation and fading effects which degrade the quality of service of narrow beams. A broad beam may be rapidly dithered with a dither angle that is much less than the beam angle, which may result in a beam that consistently hits a desired optical receiver 104 while averaging out scintillation and fading effects. This dithering or rapid beam path shifting may also offer increased safety, with beams being shifted that the beam paths never dwell in one area for an undesirable amount of time.

Figure 9A:
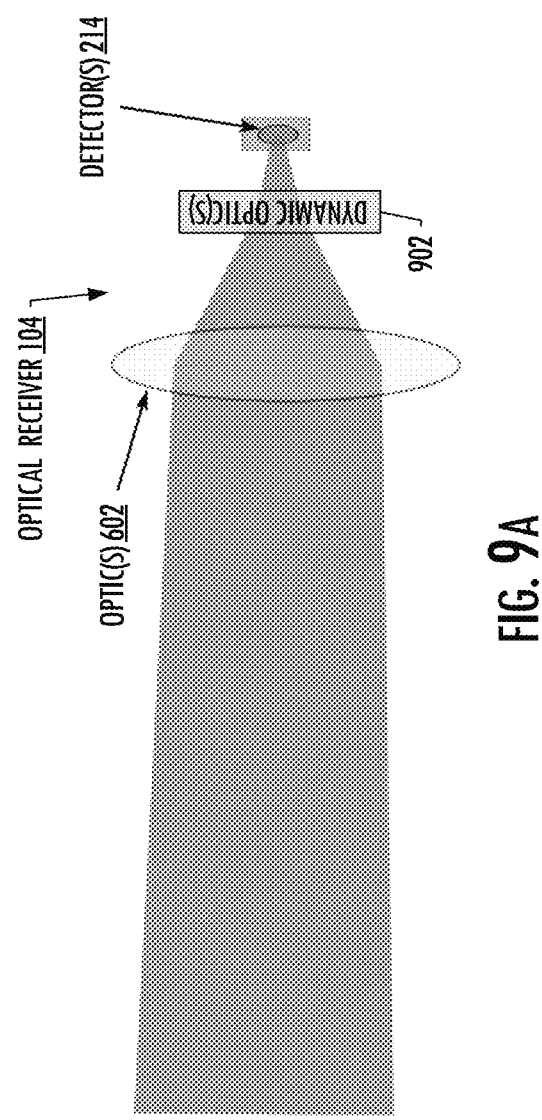
FIGS. 9A, 9B and 9C illustrates an optical receiver including dynamic optic(s) configured to enable an adjustable focus of the optical beam (FIG. 9A), and for a line-of-sight (LOS) case (FIG. 9B), and a non-LOS (NLOS) (FIG. 9C), in accordance with some example implementations.
Figure 9B:
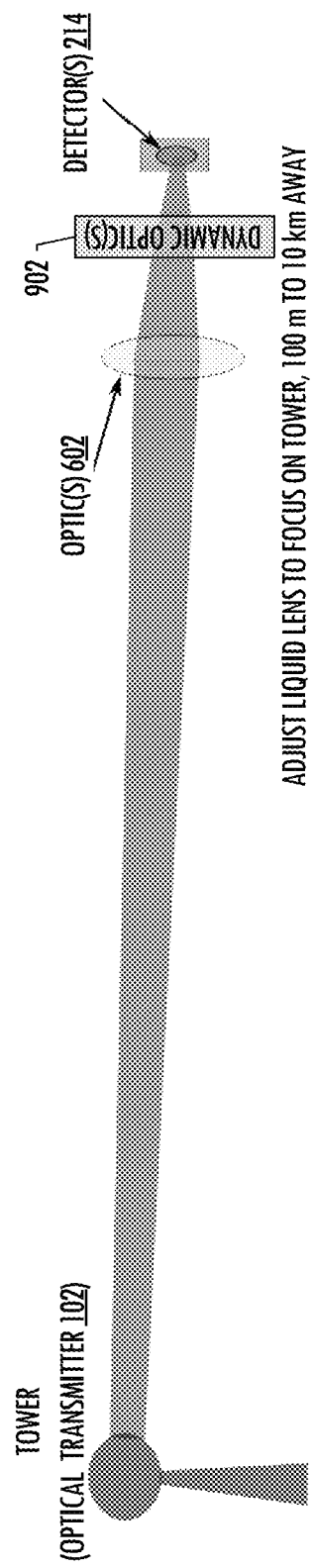
Figure 9C:
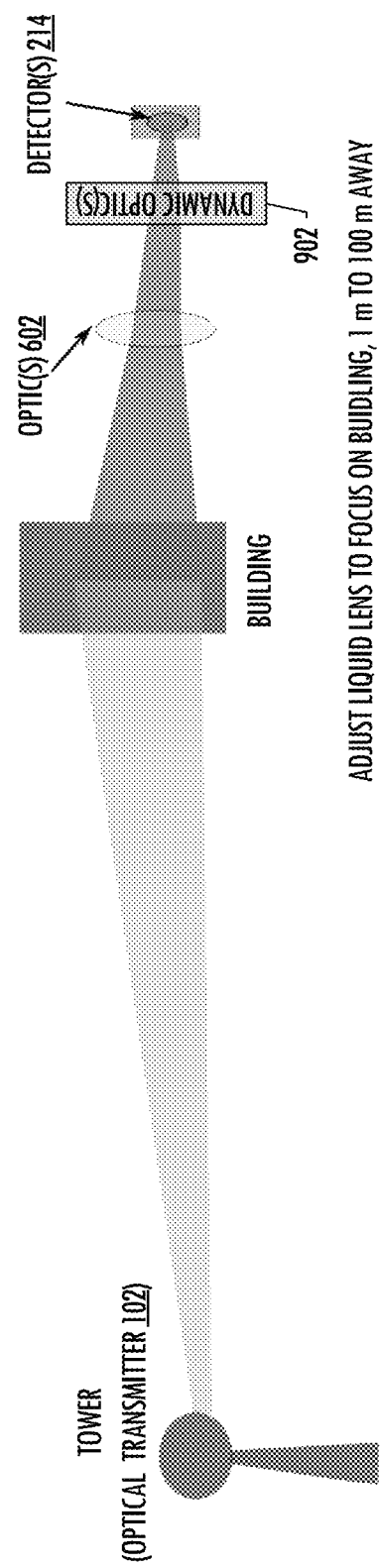

FIG. 9A illustrates an optical receiver 104 including dynamic optic(s) 902 configured to enable an adjustable focus of the optical beam. This adjustable focus may facilitate a match of the optical receiver to characteristics of the optical beam. So for a LOS case, as shown in FIG. 9B, the optical receiver may desire an infinite or nearly infinite focus since the incoming beam may be effectively collimated at the receiver. For LOS in weather, it may be desirable to focus at some intermediate point between the optical transmitter 102 and receiver since the scattering due to rain, snow, fog or other may generate an effective source point between the optical transmitter and receiver. As shown in FIG. 9C, this may be similarly the case for NLOS in which it may be likewise desirable to focus on some intermediate point between the optical transmitter and receiver.

Figure 9D:
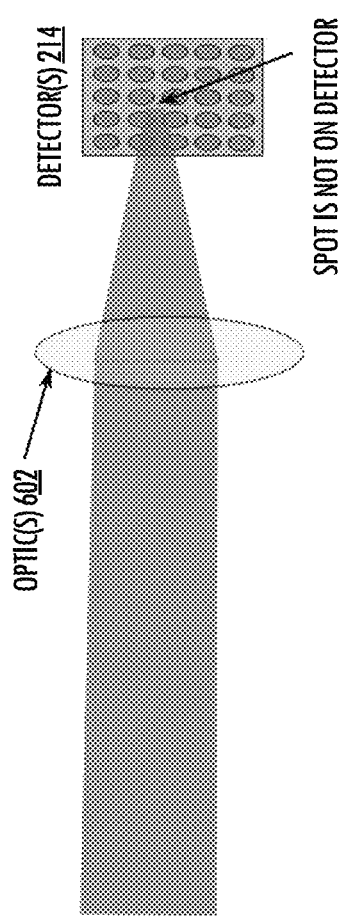
FIGS. 9D and 9E illustrates use of dynamic optic(s) to enable pointing adjustment at the optical receiver, in accordance with some example implementations.
Figure 9E:
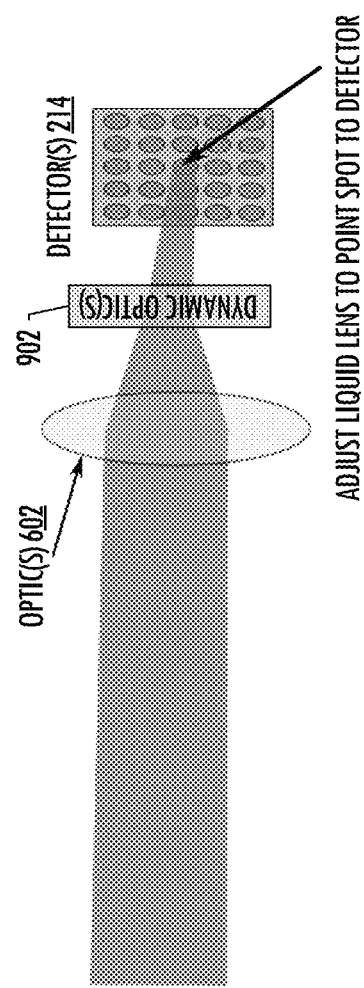

FIGS. 9D and 9E illustrates use of dynamic optic(s) 902 to enable pointing adjustment at the optical receiver 104. As shown, the dynamic optic(s) may allow adjustment of a quasi-collimated beam so that it hits a single detector or a subset of an array of detectors 214 of the optical receiver. This may be accomplished at the same time as adjustment of the focus at the optical receiver.

Figure 10:
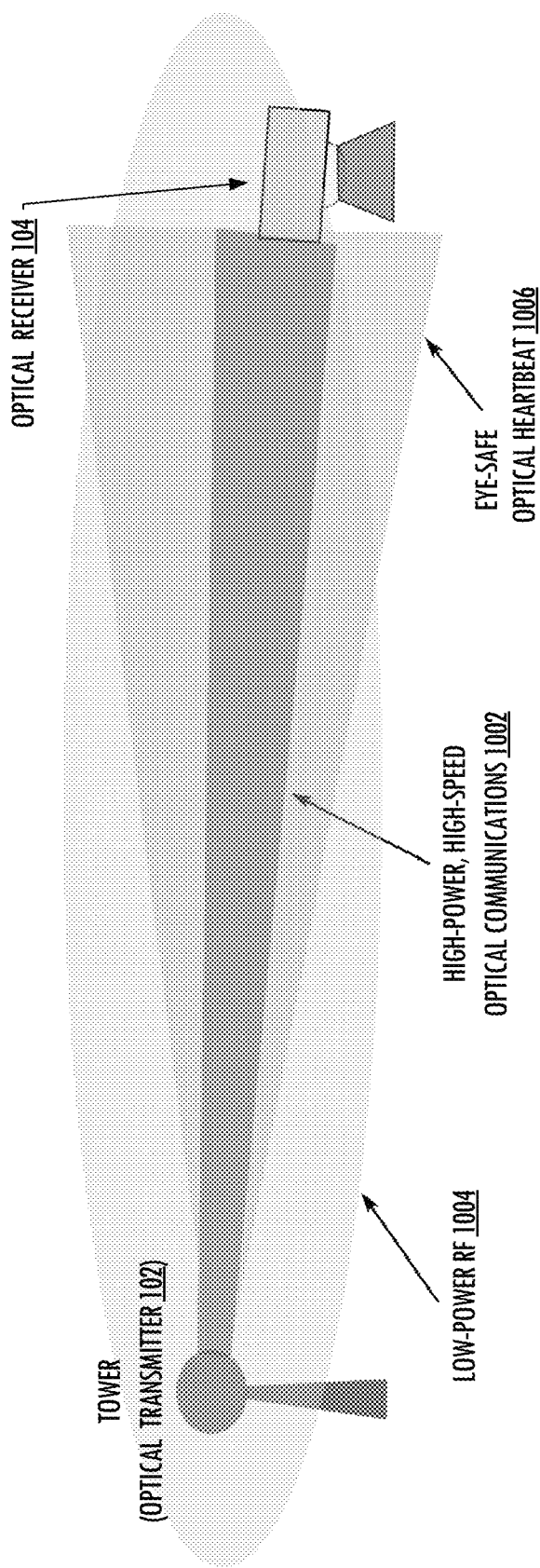
FIG. 10 illustrates a few techniques for at least an initial alignment between optical transmitter and receiver for communication, in accordance with some example implementations.

At least an initial alignment between optical transmitter 102 and receiver 104 for communication may be accomplished in any of a number of different manners. FIG. 10 illustrates a few example techniques introduced above. As shown, the diverged-beam communications system 100 may be configured to provide high-power, high-speed optical communications 1002. In some examples, in some examples, an RF system may underlay the diverged-beam communications system, and provide low-power RF communication 1004 between the optical transmitter and receiver to establish their location and assist in their alignment. This RF communication may include an RF heartbeat signal composed of a set of one or more RF signals that may assist in alignment of the optical transmitter and receiver. And in some examples described in greater detail below, the optical transmitter may be configured to emit an optical heartbeat 1006 (an optical heartbeat signal) composed of a set of one or more broad optical beams, which may assist in alignment of the optical transmitter and receiver. In some examples, the heartbeat signal may be modulated to carry or indicate the location (geographic location) of the optical transmitter, and/or a signal may cause the optical receiver to return its location or an indication of its location to the optical transmitter, so that the optical transmitter and receiver may be aligned (or their orientation with respect to each other or the optical beam may be otherwise adjusted). The optical transmitter and receiver may know their locations, or in some examples may acquire their locations such as via GPS or other geolocation method. Or in some examples, the optical transmitter or receiver may determine the location of the other such as using timestamps embedded into the heartbeat signal.

In accordance with example implementations, an optical heartbeat emitted by the optical transmitter 102 may be an optical beam that is at or below a desired power limit in all cases, and which may be modulated at a slower rate than the system's high-power, high-speed optical communications 1002. For the alignment case, the optical transmitter may emit the heartbeat (optical or RF). The optical receiver 104 may detect the heartbeat, such as through a camera with a large field of view (e.g., 10's of degrees up to 180 degrees or more) configured to capture at least a portion of the heartbeat. The optical receiver may identify the optical transmitter heartbeat, and move, if needed, to align with the optical transmitter. Or in some examples including an array of optical receivers, one or more of the optical receivers of the array most-closely aligned with the optical transmitter may be selectively activated (e.g., switched on) with the other optical receivers selectively deactivated (e.g., switched off), without movement of any of the optical receivers. Other techniques for selective activation or deactivation of optical receivers may be employed, including techniques based on the relative power of the received optical beam, or through the heartbeat. In any event, the optical receiver may then through an associated transmitter (optical or RF) transmit a heartbeat back to the optical transmitter. The optical transmitter through an associated receiver may receive the receiver heartbeat, and begin transmitting high-speed optical communications. In some examples, the receiver heartbeat may also guide the optical transmitter into increased alignment with the optical receiver, such as before transmission of high-speed optical communications.

In some examples, the optical transmitter 102 may monitor the heartbeat from the optical receiver 104. In instances in which the optical receiver heartbeat falls below a threshold level or other criteria, the optical transmitter may disable high-power, high-speed optical communications 1002. The optical transmitter may then wait until it picks up or otherwise detects the receiver heartbeat again (above the threshold level or other criteria), and then reestablish high-power, high-speed optical communications. The shutdown time may be sufficient to keep the optical exposure level below the desired power limit, but may allow reestablishment of the high-speed optical communications as quickly as possible (e.g., on the order of milliseconds or faster). For example, a tree branch waving back and forth in the beam path may interrupt the beam for a fraction of a second each time it passed through the beam, but a sufficiently-fast restart may minimize any impact on communications throughput.

Figure 11A:
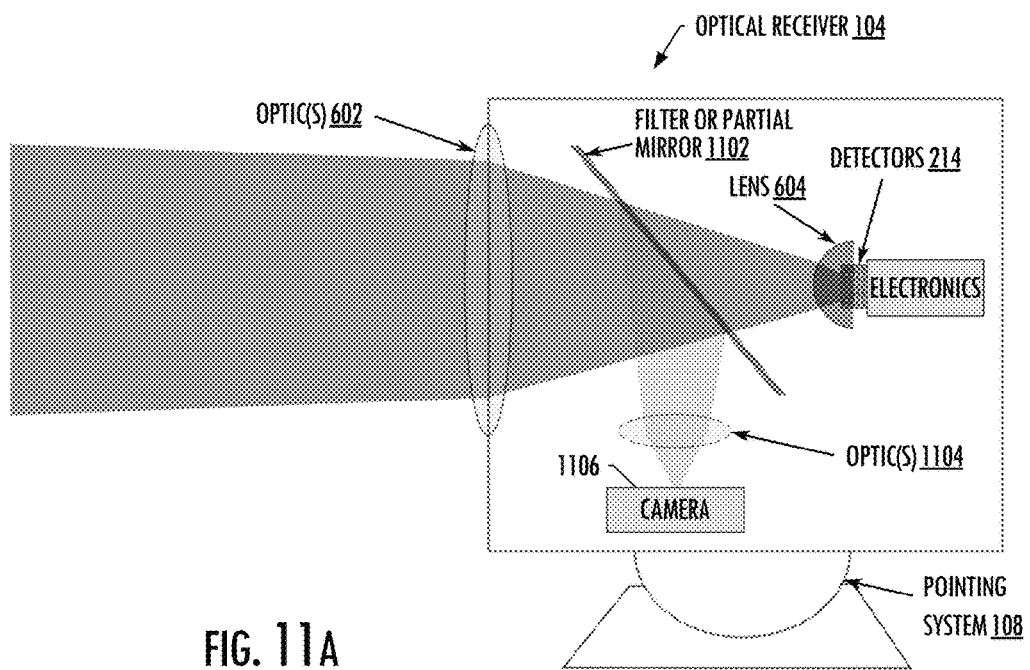
FIGS. 11A and 11B illustrate two examples for alignment between the optical transmitter and receiver that may be at least partially accomplished within the optical receiver, in accordance with some example implementations.
Figure 11B:
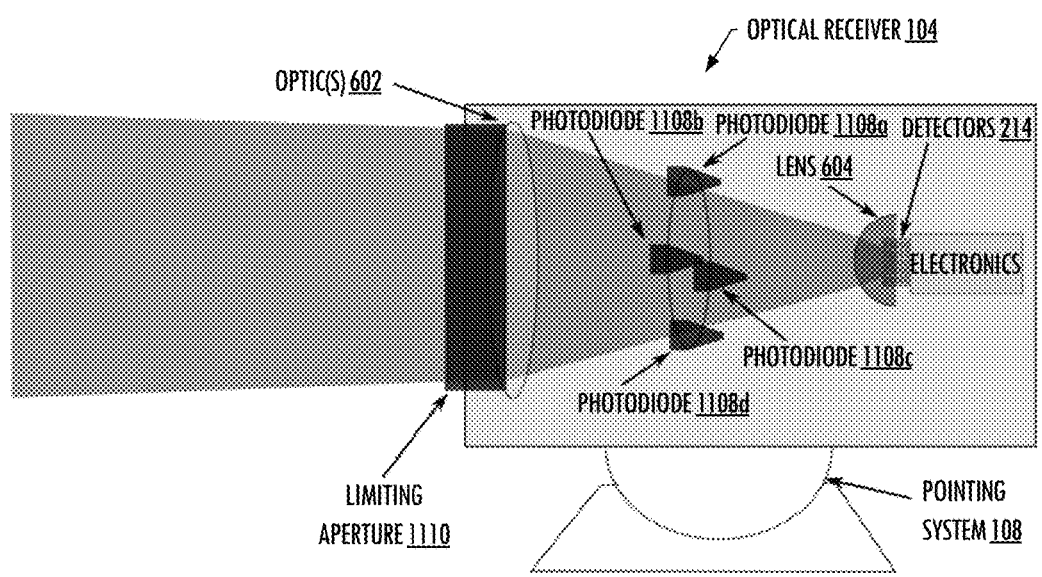

In some examples, alignment between the optical transmitter 102 and receiver 104 may be at least partially accomplished within the optical receiver, and according to a number of different techniques. FIGS. 11A and 11B illustrate two examples. As shown in FIG. 11A, the optical receiver may include a filter or a partial-pickoff mirror 1102 configured to reflect a portion of the detected optical beam through appropriate optic(s) 1104 and to a camera 1106. The camera may be configured to capture the reflected portion of the optical beam, and communicate with electronics of the optical receiver to drive coarse steering (e.g., motor, receive pointing system 218) and/or fine steering (e.g., MEMS mirror, dynamic optic or other method) based on the captured reflected portion of the optical beam. In some examples, the array of emitters 208 of the optical transmitter may include one or more emitters, or the optical transmitter may include one or more additional emitters, configured to emit an optical beam at a rate less than the frame rate of the camera to allow tracking, lock-in and heartbeat.

As shown in FIG. 11B, in another example, the optical receiver may include a plurality of photodiodes 1108 (four illustrated as photodiodes 1108a, 1108b, 1108c, 1108d) positioned around a periphery of and that may be shadowed by a limiting aperture 1110. In this example, the photodiodes may be configured to detect a relative power of the detected optical beam at the photodiodes (relative to the overall power of the detected optical beam at the detector 214), and communicate with electronics of the optical receiver 104 to drive coarse steering (e.g., motor, receive pointing system 218) and/or fine steering (e.g., MEMS mirror, dynamic optic). In some examples, only three photodiodes may be used, such as photodiodes 1108a, 1108b and 1108c located approximately 120 degrees apart around a circle. In a more particular example, the feedback control could be summarized as follows for the relative powers detected at the respective photodiodes:

If [photodiode 1108b>photodiode 1108c], then pan in a first direction (e.g., right);
If photodiode 1108b<photodiode 1108c, then pan in an opposite, second direction (e.g., left);
If [photodiode 1108a>(photodiode 1108b+photodiode 1108c)/2], then tilt a third direction (e.g., down); and
If [photodiode 1108a<(photodiode 1108b+photodiode 1108c)/2], then tilt an opposite, fourth direction (e.g., up).

Although described in the context of steering or panning the optical receiver 104, as explained above, in some examples including an array of optical receivers, alignment may be accomplished without movement of an optical receiver. In these examples, one or more of the optical receivers of the array most-closely aligned with the optical transmitter may be selectively activated (e.g., switched) on with the other optical receivers selectively deactivated (e.g., switched off), without movement of any of the optical receivers.

Figure 12A:
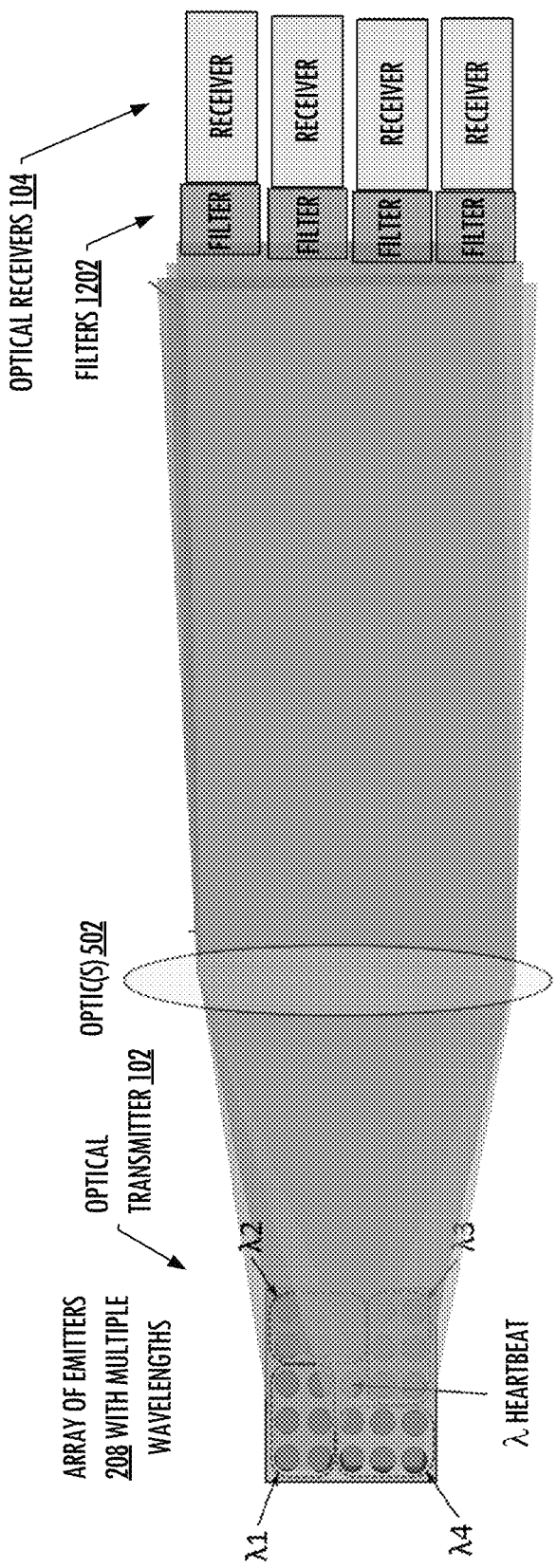
FIGS. 12A and 12B illustrate respectively spectral multiplexing and spatial multiplexing that may be implemented by the diverged-beam communications system, in accordance with some example implementations.

As explained above, in some examples, a single optical transmitter 102 may serve multiple receivers, such as those residing within the cone of its optical beam (for the LOS case). As explained above, this may be accomplished in a number of different manners, such as according to one or more multiplexing techniques. FIG. 12A illustrates one example multiplexing technique, namely, spectral multiplexing. As shown, the array of emitters 208 of the optical transmitter may be divided into groups of one or more emitters with different, respective wavelengths (shown as $\lambda 1$, $\lambda 2$, $\lambda 3$, $\lambda 4$, and with a separate emitter for the aforementioned heartbeat). The emitters of the groups may be arranged in the array by region, as shown; or in other examples, the emitters may be interspersed with one another. The optical receivers 104 may include one or more wavelength-specific or wavelength-tunable filters 1202 in front of all or parts of one or more of their detectors 214. In some examples, tunable filters may be dynamically tunable as the wavelength of the emitters shift due to various conditions such as changing environmental conditions, particularly temperature.

Figure 12B:
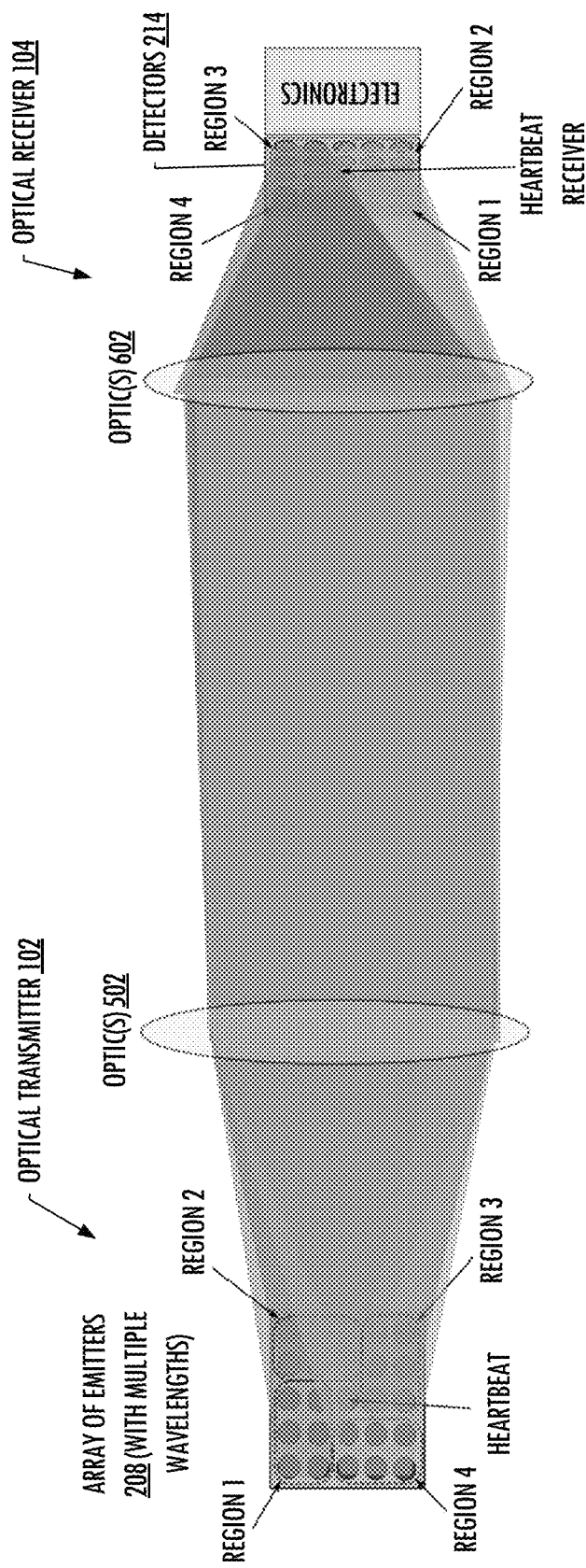

In addition to or in lieu of spectral multiplexing, the diverged-beam communications system 100 in some examples may employ spatial multiplexing (SMX), such as in a manner shown in FIG. 12B. As shown, the array of emitters 208 of the optical transmitter may be arranged in a pattern of emitters (e.g., pattern of groups of one or more emitters) that may be independently modulated (shown as region 1, region 2, region 3, region 4, and with a separate emitter for the aforementioned heartbeat). The array of detectors 214 at the optical receiver 104 may be similarly arranged in a corresponding pattern of detectors. In some examples, the system may use spatial multiplexing in clear conditions. The system may then turn off or reduce the spatial multiplexing in the event of significant scattering (e.g., from weather) or a NLOS case, potentially reducing overall bandwidth but maintaining communication capacity.

Further features of the diverged-beam communications system 100 in various examples include the optical transmitter 102 trying multiple paths and/or signalling the user to turn or move their optical receiver 104 to optimize their alignment and increase the received signal speed and quality of service. This signaling to the user may be accomplished in a number of different manners such as by text, symbols, speech, tones or other optical, acoustical, tactile or other signals. In more particular examples, the optical transmitter may signal the user to move to a window, or move to their front, rear, left or right. In another particular example, the optical transmitter may signal the user to turn in a circle, and signal the user as to when to stop turning. Or in yet another example, the optical transmitter may signal the user to move, turn or tilt the optical receiver.

In some examples, retro-reflection may be used to facilitate safe power levels. In accordance with these examples, the optical transmitter 102 or array of optical transmitters may emit short pulses, and include one or more detectors or other sensors configured to monitor any return (reflected) signals. A large-intensity reflection at a very short time delay may indicate an object in the transmit beam at close range, which may cause the optical transmitter or array to stop emitting that beam in favor of a different emitter or different transmitter of the array. The speed of response of the system may facilitate safe operation, as the beam may be cut off before reaching certain known and regulated energy thresholds that can only occur with sufficient accumulation of light energy over a sufficiently long period of time.

In some examples, 3D modeling of the environment of the diverged-beam communications system 100 may be used to optimize its throughput. This may be accomplished using existing terrain and urban architecture databases and imagery, data collected by system, or any combination thereof. In a more particular example, retro-reflection intensities and time delays can be used to effect a LIDAR-type capability. From the 3D model of the environment, optimum beam paths may be predicted, both for fixed and mobile optical transmitters 102 and receivers 104. In the case of mobile optical receivers, the path of the receiver may be modeled into the 3D model to create an optimum beam path for reception by the mobile user. The 3D model may be adaptive, responding to changes such as a good reflector 118 (e.g., a parked truck that moves to a different location). Beam reflection and transmission intensity information obtained by the system may be used to improve the initial 3D model, or to create a new 3D model.

In one example, a fixed-delay router (optical relay node) may be used in which the same components and frequencies may be used in both the large-scale external carrier systems (e.g., cell phone macrocell sites) and local router systems. This may provide economies of scale and commonality that improves system efficiencies.

In some examples, steerable relay beams may be generated by the diverged-beam communication system 100. Cooperating users/routers may relay signals from macrocell to mobile or other users.

In some examples, autonomous fixed or mobile optical transmitters, receivers or transceivers (sometimes referred to as cell nodes) may be deployed, such as in the form of very low-weight and low-power optical relay nodes. In these examples, the lightweight optical relay nodes may be deployed in the air (e.g., in balloons, unmanned aerial vehicles, dirigibles) or on buildings, towers, poles, trees or other locations above ground level. In one example, these autonomous optical transmitters, receivers or transceivers may be solar powered.

In some examples, exterior, interior, or both light guides may be used to propagate signals from the diverged beam communication system.

In some examples, rapid beam frequency scanning may be used for security, interference suppression and/or SNR improvement to combat solar background and multipath distortion. In one example, an all-semiconductor akinetic laser may be electrically tuned and avoid the use of any mechanical or electro-mechanical components.

In some examples, an ad-hoc network may be created, with active users contributing to and forming the network.

In some examples, the diverged-beam communication system 100 may be integrated into existing mobile data transmission devices such as mobile phones, tablets, or personal computers by use of a piggyback device, similar to some mobile phone batteries, where the optical components may be integrated with the existing mobile device.

In some examples, mechanical baffles may be used in the optical receiver architecture to allow for selection of a single beam from the optical transmitter, thus reducing multipath problems and the effect of incident sunlight on the receiving system. In another example, optical collimators at the optical receiver 104 may reject signals outside of a narrow acceptance range, ameliorating multipath effects.

Multipath factors and interference in the diverged-beam communication system 100 may be addressed in a number of ways. In one example, the likely strongest signal path (whether direct or reflected) between the optical transmitter 102 and receiver 104 may be short enough that other paths with signal strength above a rejection threshold are insufficiently longer or shorter than the stronger signal path to cause inter-symbol interference. This situation may apply to relatively short paths at relatively low data rates. In one example, coding may be used to mitigate the effects of multipath interference. In another example, optical signals may be frequency division encoded to account for the smearing of the pulses in the multipath environment and to reduce inter-symbol interference. The receiver may reconstruct the signals. As such, orthogonal frequency division multiplexing (OFDM) may be used to combat the multipath issue. In another example, synchronized receiver time gating may be used to restrict photons to only those that travel the shortest or most efficient path.

Figure 13:
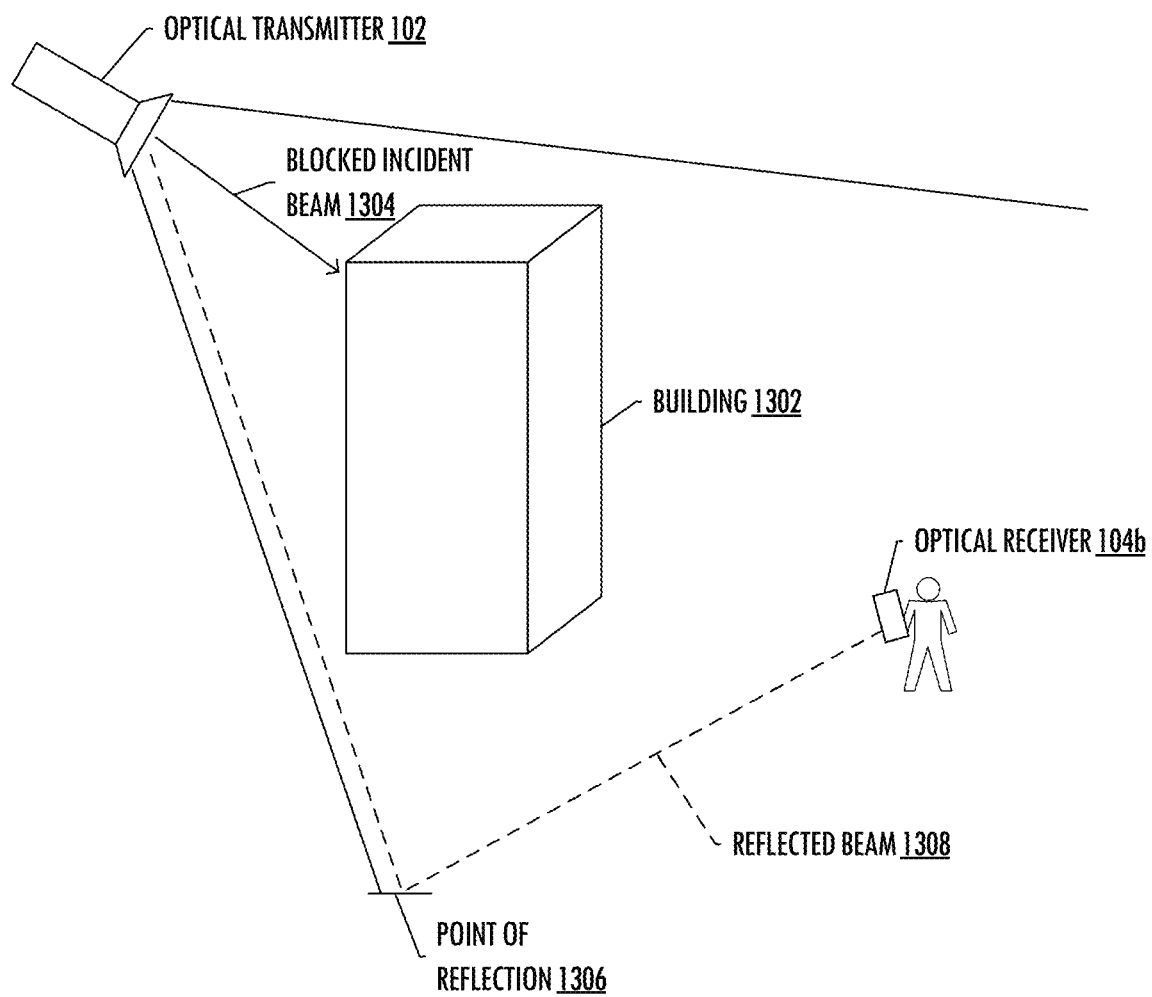

To further illustrate the diverged-beam communications system 100 of example implementations, reference will now be made to FIGS. 13-17, 18A and 18B, which illustrate various scenarios in which example implementations may be deployed. As explained above, certain optical receivers 104a may detect incident beams from an optical transmitter 102, while other optical receivers 104b (or even the same receivers) may detect reflected beams (including scattered beams) from a reflector 118 (including a scatterer). FIG. 13 illustrates a scenario in which a building 1302 may block an emitted optical beam (shown as blocked incident beam 1304) from reception by an optical receiver 104b. As shown, though, a point of reflection 1306 on an appropriate reflector such as the ground or another building may produce a reflected beam 1308 that may be received by the optical receiver 104b. The optical receiver here may be fixed or mobile, although for a mobile receiver, additional alignment to the incident or reflected beam may be desired or required, and sensitivity issues may require additional consideration.

Figure 14:
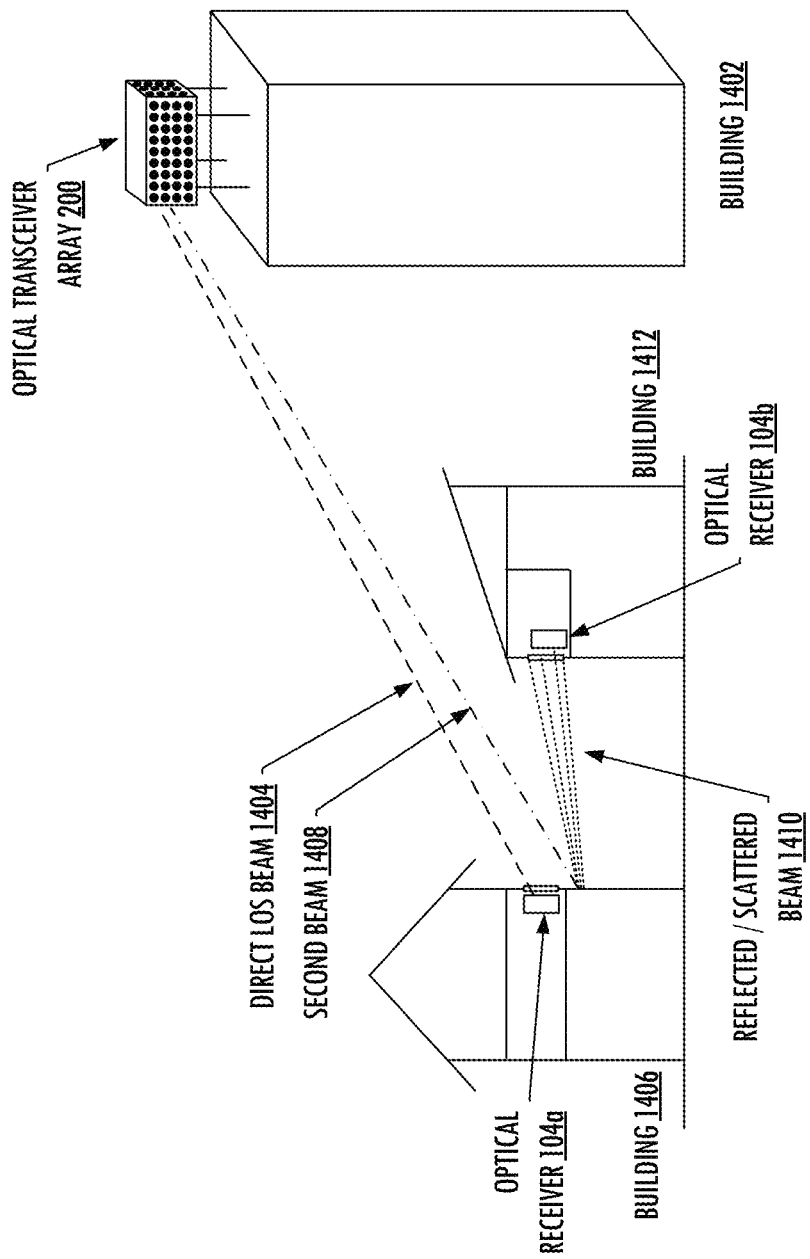

FIG. 14 illustrates an example deployment of the diverged-beam communications system 100 in a fixed-receiver environment. As shown, an array of optical transmitters, such as of an optical transceiver array 200, may be placed on a host building 1402, tower or other location. The optical transmitters may produce beams including an incident beam 1404 with a direct line-of-sight (LOS) to one or more optical receivers 104a (shown in a building 1406), and another, second incident beam 1408 that may be reflected or scattered to produce a reflected/scattered beam 1410 detectable by one or more optical receivers 104b (shown in another building 1412). In another example, not shown in the figure, the reflected/scattered beam may be produced by the direct line-of-sight beam. The optical receiver 104a may receive light directly from the direct line-of-sight beam, and it may also receive direct line-of-sight light from the second beam. The second beam may be used to generate the reflected/scattered beam, which may be Lambertian in nature and scatter light over a full 180 degrees. This second beam may then be received by optical receiver 104b. In another example not shown in the figure, a fixed reflective or scattering surface, or both types of surfaces, may be attached at an initial point of incidence of the second beam to generate a reflected/scattered beam that may more efficiently direct the light to the optical receiver 104b.

As indicated above, the optical receivers 104a, 104b in the scenario of FIG. 14 may be fixed. In other examples, and as more particularly described below in an example scenario, either or both of the optical receivers may instead be moveable or mobile within a certain area. In one example, a user may physically carry or place their receiver to differing locations within a certain area. In another example, the either or both receivers may be equipped with devices that allow them to move autonomously in one or more (e.g., six) degrees of freedom to improve reception.

Figure 15A:
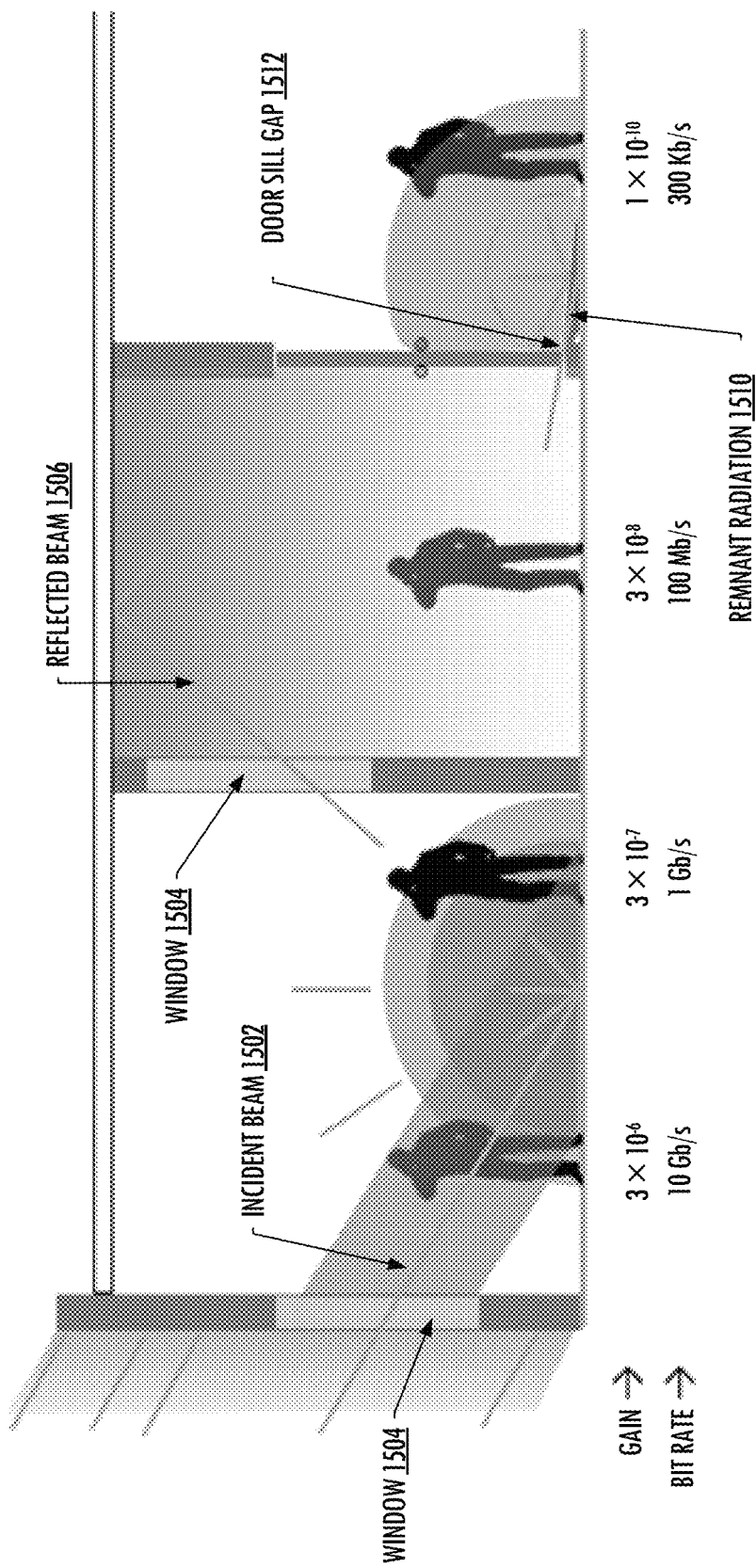
Figure 15B:
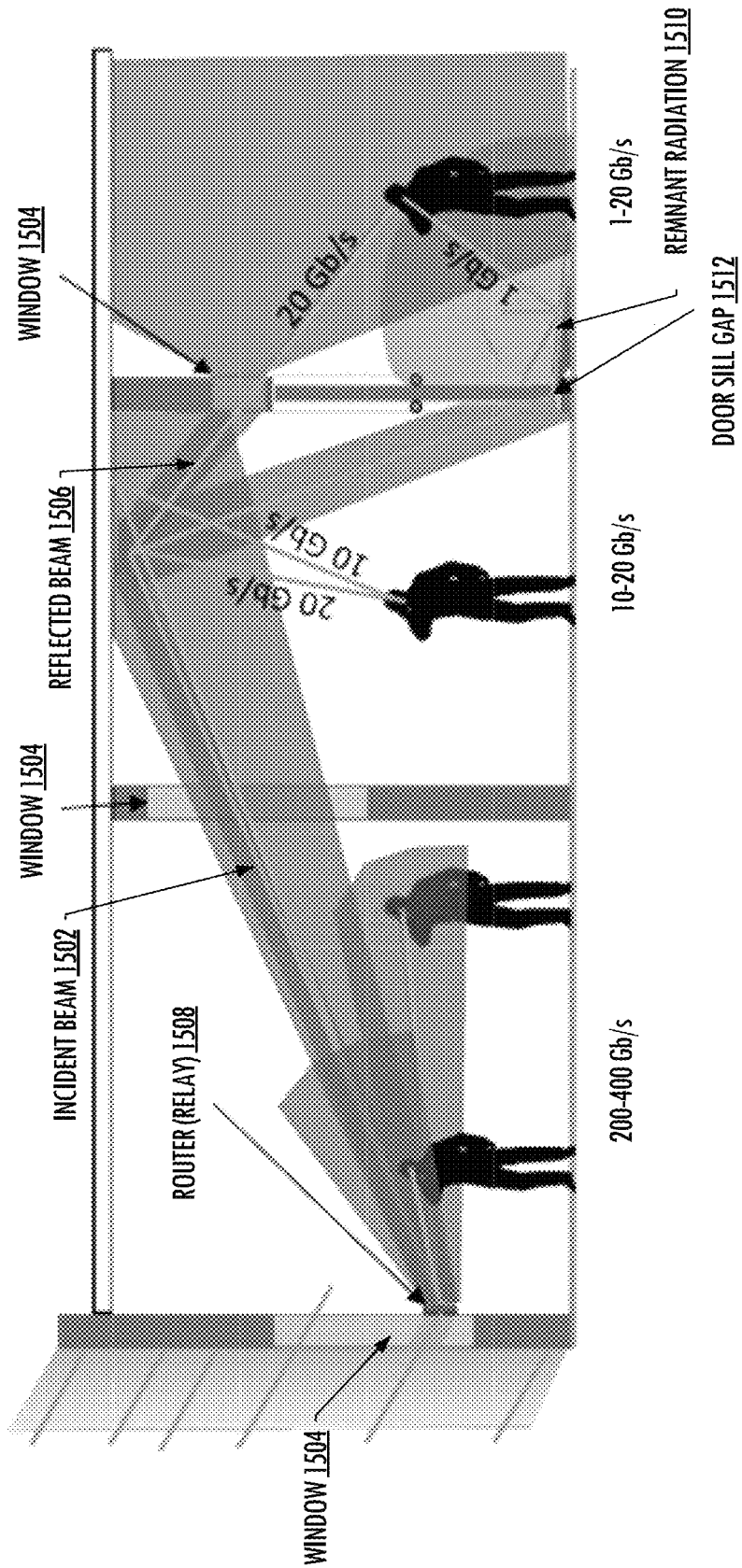

FIG. 15A illustrates reception of an incident beam 1502 through a window 1504 of a building (e.g., building 1410, 1412), vehicle or other structure, which beam may reflect off a ceiling, floor or wall to create a reflected beam 1506. FIG. 15B illustrates a similar scenario in which the incident beam is received by a router (optical relay node) 1508 for relay as another incident beam, which similarly may reflect off a ceiling, floor or wall to create a reflected beam. In either instance, the incident beam may be directly received. The reflected beams may also be directly received, or they may result in remnant radiation 1510 in the form of propagated radiation such as what may pass through a doorsill gap 1512. Because the system can adapt to the various power levels ranging from those which occur in directly received incident or reflected beams to those occurring in propagated radiation, the transmission path is not critical and the system can pick up incident, reflected, or remnant radiation as required.

FIG. 15C illustrates more particularly the router (optical relay node) 1508 according to some example implementations. As shown, the router may include an outside arrangement and an inside arrangement. The outside arrangement may include one or more outside optical receivers with one or more an outside detectors 1514 configured to receive an optical beam, and the inside arrangement may include one or more inside optical transmitters with one or more inside emitters 1516 configured to retransmit the optical beam. Although not separately shown, in some examples, the inside arrangement may also include one or more inside optical receivers with one or more inside detectors configured to receive an optical beam, and the outside arrangement may include one or more outside optical transmitters with one or more outside emitters configured to retransmit the optical beam. In one particular example, the outside and inside detectors may cover an area of 100 cm2, and provide 1000 photons/bit; and the inside and outside emitters may cover ±45 degrees. The inside emitter may be capable of 20 degrees pointing, while the outside emitter may be capable of 0.5 degrees pointing.

FIG. 16 illustrates an example deployment of the diverged-beam communications system 100 in a mobile-receiver environment. As shown, again, an array of optical transmitters, such as of an optical transceiver array 200, may be placed on a host building 1402, tower or other location. The optical transmitters may produce beams including an incident beam 1602 that produces building-reflected beams 1604, as well as ground-reflected beams 1606. These beams including the incident and reflected beams may then be received by one or more optical receivers 104a, 104b. In some examples, the receivers may intentionally "look away" from the incident beam to obtain a more stable, although lower-power-level beam than the direct beam. For example, radiation reflected from a building or the ground may be more constant than the direct radiation from the transceiver array. This determination may be made in a number of different manners, such as by SNR. As such, the optical receivers may preferentially detect or otherwise lock onto a reflected beam, and avoid direct detection of the incident beam.

Figure 17:
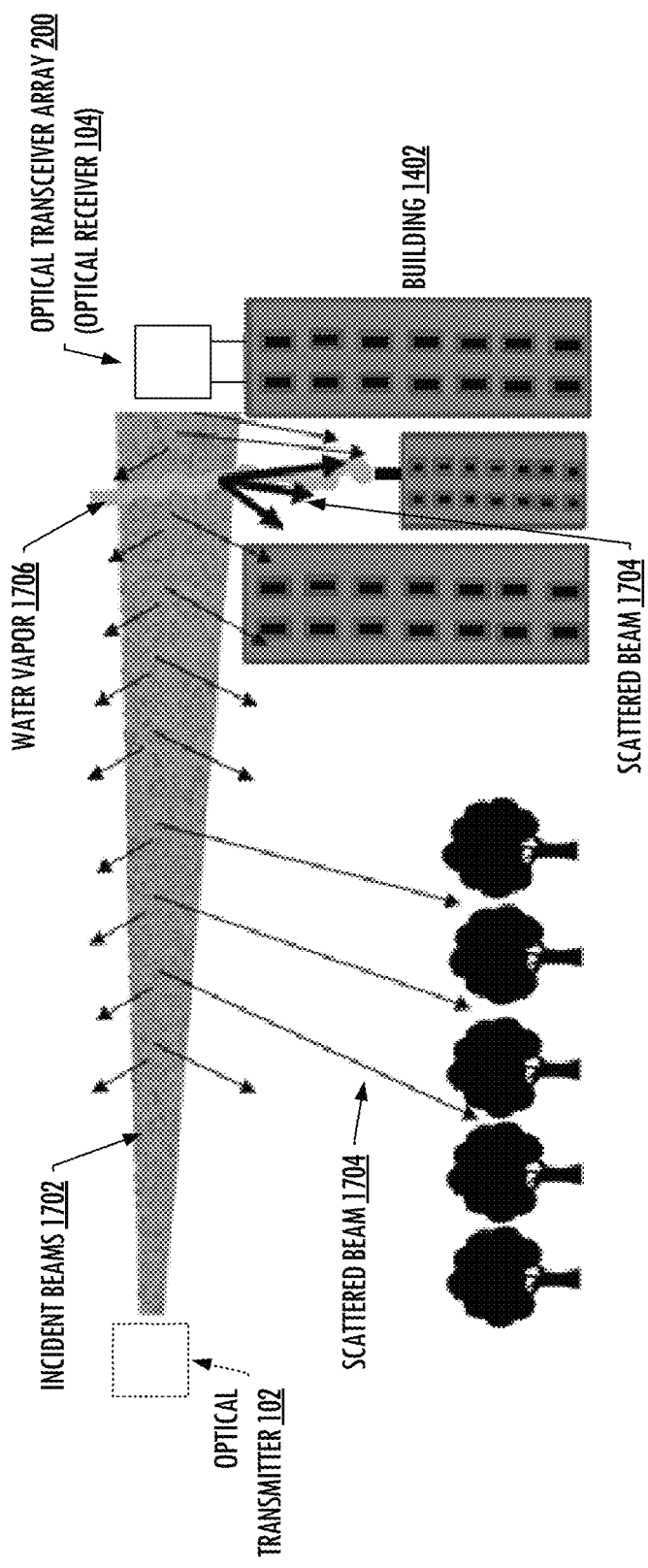

FIG. 17 illustrates an example deployment of the diverged-beam communications system 100 in urban and rural (e.g., wooded) environments. Yet again, this example includes an array of optical transmitters, such as of an optical transceiver array 200, placed on a host building 1402, tower or other location. As illustrated in this scenario, incident beams 1702 from the optical transmitters may be scattered from normal, relatively-homogeneous atmospheric particulates, and thereby produce reflected/scattered beams 1704. Additionally, the incident beams may be scattered from inhomogeneous atmospheric particulates, such as water vapor 1706 arising from a roof vent, or fog, clouds, smoke or the like, and thereby produce additional reflected/scattered beams. These reflected/scattered beams may be received by fixed or mobile optical receivers. In some examples, shorter wavelengths such as blue to ultraviolet wavelengths may be beneficial due to their larger degree of scattering.

Figure 18B:
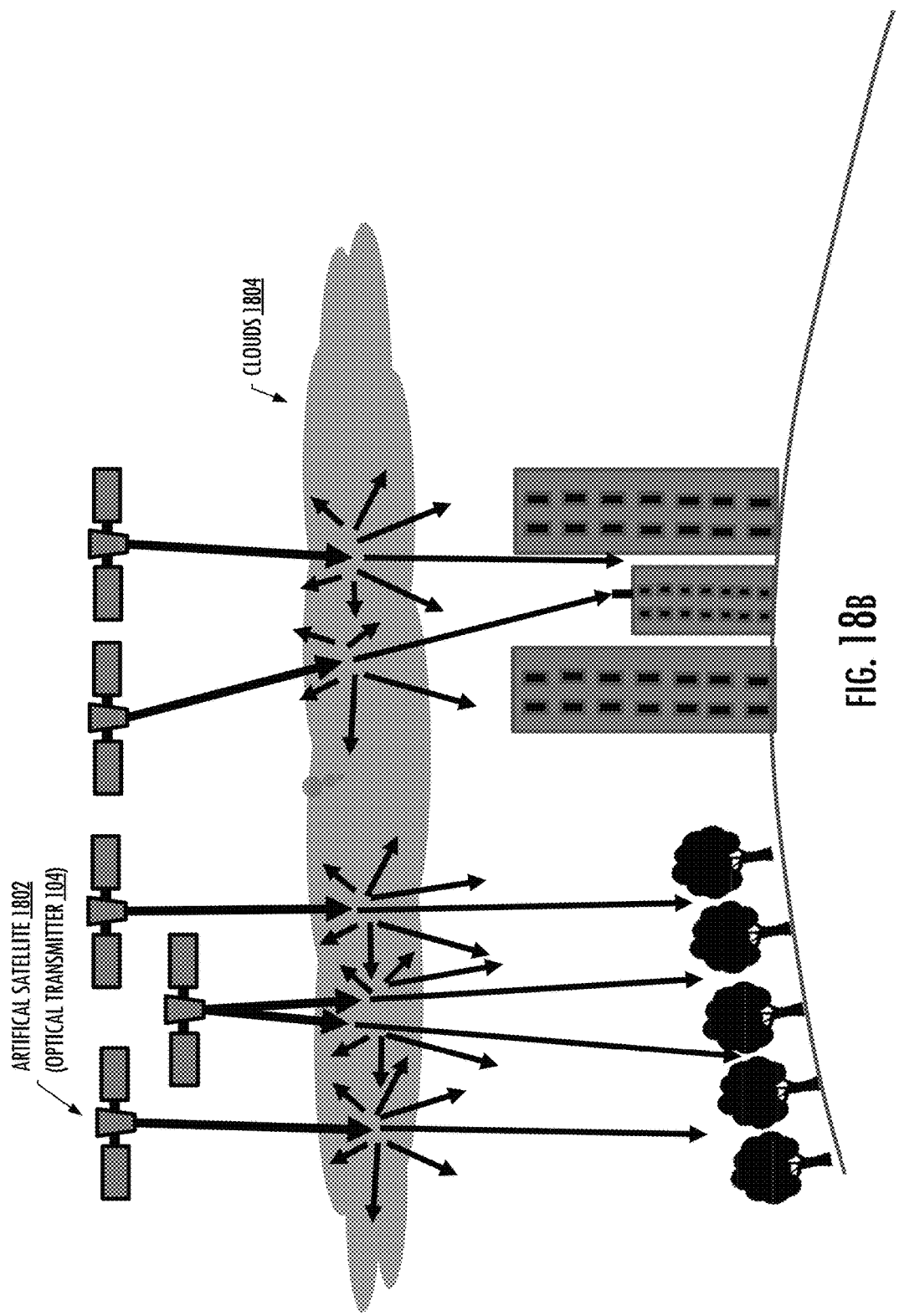

FIGS. 18A and 18B illustrate other example deployments of the diverged-beam communications system 100 in urban and rural (e.g., wooded) environments. In these examples, the system includes one or more artificial satellites 1802, such as in a proliferated network of satellites, equipped with optical transmitters or transceivers including optical transmitters (not separately shown). In this scenario, the satellites may be configured to transmit nearly or effectively vertical optical beams in urban environments and/or rural environments. These beams may be received by fixed or mobile optical receivers. These beams may be received by fixed or mobile optical receivers. In some examples, longer wavelengths such as red to infrared wavelengths may be beneficial due to their better penetration of clouds 1804, as shown in FIG. 18B.

Figure 19:
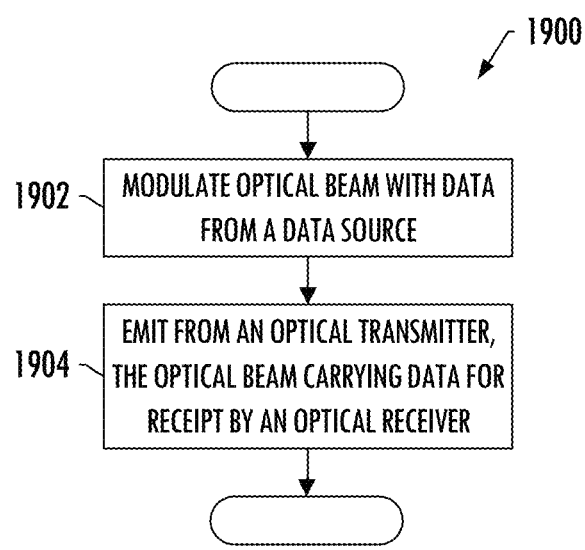
FIG. 19 illustrates various operations in a method according to example implementations.

FIG. 19 illustrates various operations in a method 1900 according to example implementations of the present disclosure. As shown at blocks 1902 and 1904, the method may include respectively modulating an optical beam with data; and emitting by an optical transmitter, the optical beam carrying the data and without artificial confinement for receipt by an optical receiver configured to detect and recover the data from the optical beam. The optical beam may be emitted with a divergence angle greater than 0.1 degrees, and with a photonic efficiency of less than 0.05%. Or in another example, the optical beam may be emitted with a divergence angle greater than 0.1 degrees, and with a photonic efficiency of less than 0.01%. And the photonic efficiency may relate a number of photons of the optical beam detectable by the optical receiver, to a number of photons of the optical beam emitted by the optical transmitter.

Example implementations of the present disclosure therefore provide a diverged-beam communications system 100 and method for optical communications, and more particularly diverged-beam communications. In contrast to conventional FSO communications, the system and method of example implementations use much broader beams and much higher power levels. A significant portion of the power of the optical beam may be "wasted" relative to more conventional FSO communications, but the broader beams make pointing and tracking either completely unnecessary or easy and affordable. These high power broad beams also enable flexibility for mobile users, higher quality of service, and the feasibility of non-line-of-sight (NLOS) and obstructed line-of-sight applications in which reflection and scattering propagation may enable high data rate throughputs and high quality of service.

The diverged-beam communications system 100 and method may employ a high-power solid state laser or other emitter for high data rate wireless communications above 1 Gb/s, and in some examples up to 1 Tb/s or more. In some examples, the system may also optimize beam divergence for each communications link. The beam divergence angles may be fixed or slowly or rapidly varied. The system does not require line of sight between the optical transmitter 102 and optical receiver 104. The emitter emission powers used in the diverged-beam communications system may be such that very high data transmission rates are achievable even with multiple reflections.

The diverged-beam communications system 100 may be contrasted with traditional FSO transmission in a number of different manners, such as based on the photonic or transmission efficiency and divergence of its optical beam. Here, photonic efficiency may relate a number of photons detectable by the optical detector, to a number of photons of the beam emitted by the optical transmitter. In this regard, the number of photons detectable by the optical detector may be defined or otherwise constrained by its acceptance angle. In some examples, photonic efficiency may be represented as a ratio (E) of the number of photons ($A_R$) detected by the optical receiver 104 divided by the number of photons ($A_T$) emitted by the optical transmitter 102 ($E=A_R/A_T$). The factor E may be affected by many variables, including beam divergence or beam width.

While the traditional approach may achieve high efficiency of transmission (E=10%-90%), it requires a very narrow beam with a divergence on the order of 0.0005-0.005 degrees, which in turn requires that it be pointed with extreme precision at a higher cost. The diverged-beam communications system of example implementations, on the other hand, uses a far broader beam. In some examples, its beam may only achieve a photonic efficiency of 0.01%—0.00001%, but through a broader beam with beam divergence on the order of 0.2-6 degrees, which may relax pointing requirements such that the pointing system is highly affordable. In other examples, the beam divergence angles may be in the range of 0.02-20 degrees, 0.1-10 degrees, or the like. In a more general case, in some examples, the diverged-beam communications system may operate with a beam divergence greater than 0.1 degrees, and with a photonic efficiency of less than 0.01%. Or in other examples, the diverged-beam communications system may operate with a beam divergence greater than 0.1 degrees, and with a photonic efficiency of less than 0.05%.

In existing FSO line-of-sight systems, the optical transmitters are typically only 0.01-10 mW, or perhaps 30-50 mW. These FSO systems have been limited by the cost of lasers and safety concerns, which has meant that power levels over about 100 mW or over 1 W have been economically infeasible and/or unsafe. These systems have therefore sought to minimize laser power. By contrast, the diverged-beam communications system 100 of various example implementations of the present disclosure seeks to utilize an increased if not the maximum available laser power.

In the diverged-beam communications system 100, power of the optical transmitter 102 may not be a limitation of the system, and may only present economic challenges related to energy consumption and cost. Existing wireless RF systems use a macrocell tower architecture that expends 5 kW to 50 kW of peak power to service approximately 1000 customers. This is approximately 5-50 peak watts per customer. The utilization fraction or duty cycle of this power consumption is quite low, approximately 0.1-1%, limited by spectrum utilization. The energy costs of current wireless RF systems are only in the range of US $0.1-1 per customer per month. Current high-speed wireless RF systems charge approximately US $30-100 per customer per month. Thus tower energy costs are covered by only about 0.1-1% of the price of the service.

Economically, the diverged-beam communications system 100 of example implementations may be challenged by energy costs in that energy costs exceeding a reasonable fraction of total service costs, say 10%, may cause economic issues. Thus, in some examples, the system may operate at about 100 W-1000 W peak power per customer based on energy consumption at typical spectrum utilization rates. The higher-end power output may be particularly beneficial in areas with more frequent dense fog, and the lower-end may be useful in areas of more clear air. As demonstrated above, these power levels may be ten times to over one million times that of existing FSO systems. This may be the case, for example, where the system uses the higher-end power output only when necessary to drive signals through dense fog, which may occur only in a few percent of geographical areas, and then only a few percent of the hours per month.

The diverged-beam communications system 100 and method of example implementations may also operate without an unobstructed direct LOS, enabling communications with optical receivers 104 with a highly obstructed or even completely blocked LOS to the optical transmitter 102. In some examples, the receiver may even intentionally "look away" from the optical transmitter in order to improve quality of service since the reflected beam may have much less variation than a direct, incident beam.

The diverged-beam communications system 100 and method of example implementations may support multiple beams from a single transmission point, such as from an array of multiple optical transmitters 102, or a transmitter with an array of emitters 208, which may improve reliability and quality of service. The system may also support rapidly shifting or dithering optical beams from one transmitter or emitter to another such that the beam paths never dwell in one spot long enough to present an undesired situation. This constantly shifting beams and paths may also enable constantly finding new more optimal paths to maintain a constantly high quality of service. Moreover, this dithering of broad optical beams may be accomplished with a dither angle much less than the beam angle, and may increase the likelihood that the beams hits its intended optical receiver and average out scintillation and fading effects.

Example implementations of the present disclosure may be implemented with any combination of hardware and software. If implemented as a computer-implemented apparatus, the examples may be implemented using means for performing some or all of the steps and functions described above.

Example implementations of the present disclosure can be included in an article of manufacture (e.g., one or more computer program products) having, for instance, a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium. The computer-readable storage medium has embodied therein, for instance, computer readable program code means, including computer-executable instructions, for providing and facilitating the mechanisms of example implementations. In this regard, the computer-readable storage medium may have computer-readable program code portions stored therein that, in response to execution by a processor (hardware processor), cause an apparatus to perform various functions described herein. The article of manufacture can be included as part of a computer system including the aforementioned processor, or provided separately. Or in some examples, the article of manufacture may be included in electronics of one or more components of the diverged-beam communications system 100, such as the optical transmitter 102, optical receiver 104, modulator 106, pointing system 108, control system 110 and/or data source 112.

Many modifications and other implementations of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system comprising:
    an optical transmitter assembly comprising:
        a modulator; and
        an optical transmitter coupled to the modulator and configured to emit an optical beam that the modulator is configured to modulate with data, the optical transmitter thereby being configured to emit the optical beam carrying the data and without artificial confinement for receipt by an optical receiver configured to detect and recover the data from the optical beam; and
    an optical receiver assembly comprising:
        a demodulator; and
        an optical receiver coupled to the demodulator and configured to detect an optical beam that carries data the demodulator is configured to recover, the optical receiver being configured to detect the optical beam emitted without artificial confinement from an optical transmitter configured to emit the optical beam modulated with the data,
    wherein the optical transmitter is configured to emit the optical beam with a divergence angle greater than 0.1 degrees, and with a photonic efficiency of less than 0.05%, and the optical receiver is configured to detect the optical beam emitted with a divergence angle greater than 0.1 degrees, and with a photonic efficiency of less than 0.05%, the photonic efficiency relating a number of photons of the optical beam detectable by the optical receiver, to a number of photons of the optical beam emitted by the optical transmitter.

2. The system of claim 1, wherein the optical transmitter being configured to emit the optical beam includes being configured to emit an incident beam directed at a reflector to produce a reflected beam by reflection of the incident beam, the optical transmitter being configured to emit the incident beam for receipt of the reflected beam by the optical receiver.

3. The system of claim 1, wherein the optical transmitter includes an array of emitters configured to emit the optical beam, the array having a size larger than a spot size of the optical beam at the optical transmitter.

4. The system of claim 3, wherein the optical transmitter further includes an optic through which the array of emitters is configured to emit the optical beam, the emitters of the array being configured to emit respective collimated beams but with different angles due to a spatial extent of the array, the array thereby being configured to produce the optical beam composed of the respective collimated beams and whose divergence angle is set by the size of the array and focal length of the optic.

5. The system of claim 3, wherein the optical transmitter further includes an optic through which the array of emitters is configured to emit the optical beam, the array being situated away from a focus of the optic, the emitters of the array being configured to emit respective diverging beams, the array thereby being configured to produce the optical beam composed of the respective diverging beams and whose divergence angle is set by the size of the array and a degree of de-focus due to the situation of the array away from the focus of the optic.

6. The system of claim 3, wherein the optical transmitter is configured to perform multiplexing to serve multiple optical receivers.

7. An apparatus comprising:
a modulator; and
an optical transmitter coupled to the modulator and configured to emit an optical beam that the modulator is configured to modulate with data, the optical transmitter thereby being configured to emit the optical beam carrying with data and without artificial confinement for receipt by an optical receiver configured to detect and recover the data from the optical beam,
wherein the optical transmitter is configured to emit the optical beam with a divergence angle greater than 0.1 degrees, and with a photonic efficiency of less than 0.05%, the photonic efficiency relating a number of photons of the optical beam detectable by the optical receiver, to a number of photons of the optical beam emitted by the optical transmitter, and
wherein the optical transmitter is configured to emit the optical beam with an adjustable focus or astigmatism, the adjustable focus enabling adjustment of a diameter of the optical beam at a given distance from the optical transmitter, and the astigmatism causing the optical beam to have different vertical and horizontal divergences.

8. An apparatus comprising:
a modulator; and
an optical transmitter coupled to the modulator and configured to emit an optical beam that the modulator is configured to modulate with data, the optical transmitter thereby being configured to emit the optical beam carrying the data and without artificial confinement for receipt by an optical receiver configured to detect and recover the data from the optical beam,
wherein the optical transmitter is configured to emit the optical beam with a divergence angle greater than 0.1 degrees, and with a photonic efficiency of less than 0.05%, the photonic efficiency relating a number of photons of the optical beam detectable by the optical receiver, to a number of photons of the optical beam emitted by the optical transmitter, and
wherein the apparatus is further configured to transmit a heartbeat signal for orientation of the optical transmitter and optical receiver, the heartbeat signal being modulated to carry or indicate a location of the optical transmitter, or a signal to cause the optical receiver to return its location or an indication of its location to the optical transmitter.

9. The system of claim 1, wherein the optical receiver is configured to detect the optical beam at least in some instances in which the optical receiver does not have a line-of-sight to the optical transmitter.

10. The system of claim 1 comprising an array of optical receivers including the optical receiver, or the optical receiver includes an array of detectors configured to detect the optical beam, and
wherein optical receivers of the array of optical receivers or detectors of the array of detectors are configured to selectively activate and deactivate based on their orientation with respect to the optical transmitter.

11. The system of claim 1, wherein the optical beam includes an incident beam, and a reflected beam produced by reflection of the incident beam, the optical receiver in at least one instance being configured to preferentially detect the reflected beam, and avoid direct detection of the incident beam.

12. The system of claim 1, wherein the optical receiver includes an array of detectors configured to detect the optical beam, the array having a size larger than a spot size of the optical beam at the optical transmitter.

13. The system of claim 12, wherein the optical beam is spatially multiplexed to serve multiple optical receivers, the array of detectors being arranged in a pattern of detectors that corresponds to a pattern of emitters of the optical transmitter that are independently modulated.

14. The system of claim 1 further comprising a wavelength-specific or wavelength-tunable filter to enable the optical receiver to detect the optical beam that is spectral multiplexed to serve multiple optical receivers.

15. The system of claim 1, wherein the optical receiver is configured to detect the optical beam with an adjustable focus to facilitate a match of the optical receiver to characteristics of the optical beam, the adjustable focus in at least one instance including focus of the optical receiver at some intermediate point between the optical transmitter and optical receiver.

16. The system of claim 1 further configured to receive a heartbeat signal for orientation of the optical receiver and optical transmitter, the heartbeat signal being modulated to carry or indicate a location of the optical transmitter, or a signal to cause the optical receiver to return its location or an indication of its location to the optical transmitter.

17. The system of claim 1, wherein the optical receiver includes a camera configured to capture a portion of the optical beam, and electronics with which the camera is configured to communicate to drive coarse or fine steering based on the captured portion of the optical beam to at least partially orient the optical receiver and optical transmitter.

18. The system of claim 1, wherein the optical receiver includes a plurality of photodiodes positioned around a periphery of and that are shadowed by a limiting aperture of the optical receiver, the photodiodes being configured to detect relative powers of the optical beam, the optical receiver further including electronics with which the photodiodes are configured to communicate to drive coarse or fine steering based on the relative powers of the optical beam to at least partially orient the optical receiver and optical transmitter.

19. A method comprising:
modulating an optical beam with data;
emitting by an optical transmitter, the optical beam carrying the data and without artificial confinement for receipt by an optical receiver configured to detect and recover the data from the optical beam;

detecting by an optical receiver, an optical beam emitted without artificial confinement from an optical transmitter configured to emit the optical beam modulated with data; and recovering the data from the optical beam so detected, wherein the optical beam is emitted with a divergence angle greater than 0.1 degrees, and with a photonic efficiency of less than 0.05%, and the optical beam detected by the optical receiver is emitted with a divergence angle greater than 0.1 degrees, and with a photonic efficiency of less than 0.05%, the photonic efficiency relating a number of photons of the optical beam detectable by the optical receiver, to a number of photons of the optical beam emitted by the optical transmitter.

20. The method of claim 19, wherein emitting the optical beam includes emitting an incident beam directed at a reflector to produce a reflected beam by reflection of the incident beam, the incident beam being emitted for receipt of the reflected beam by the optical receiver.

21. The method of claim 19, wherein the optical beam is emitted by an array of emitters of the optical transmitter, the array having a size larger than a spot size of the optical beam at the optical transmitter.

22. The method of claim 21, wherein the optical beam is emitted by the array of emitters through an optic, the emitters of the array emitting respective collimated beams but with different angles due to a spatial extent of the array, the array thereby producing the optical beam composed of the respective collimated beams and whose divergence angle is set by the size of the array and focal length of the optic.

23. The method of claim 21, wherein the optical beam is emitted by the array of emitters through an optic, the array being situated away from a focus of the optic, the emitters of the array emitting respective diverging beams, the array thereby producing the optical beam composed of the respective diverging beams and whose divergence angle is set by the size of the array and a degree of de-focus due to the situation of the array away from the focus of the optic.

24. The method of claim 21 further comprising:
performing multiplexing to serve multiple optical receivers.

25. A method comprising:
modulating an optical beam with data; and
emitting by an optical transmitter, the optical beam carrying the data and without artificial confinement for receipt by an optical receiver configured to detect and recover the data from the optical beam, wherein the optical beam is emitted with a divergence angle greater than 0.1 degrees, and with a photonic efficiency of less than 0.05%, the photonic efficiency relating a number of photons of the optical beam detectable by the optical receiver, to a number of photons of the optical beam emitted by the optical transmitter, and wherein the optical beam is emitted with an adjustable focus or astigmatism, the adjustable focus enabling adjustment of a diameter of the optical beam at a given distance from the optical transmitter, and the astigmatism causing the optical beam to have different vertical and horizontal divergences.

26. A method comprising:
modulating an optical beam with data; and
emitting by an optical transmitter, the optical beam carrying the data and without artificial confinement for receipt by an optical receiver configured to detect and recover the data from the optical beam, wherein the optical beam is emitted with a divergence angle greater than 0.1 degrees, and with a photonic efficiency of less than 0.05%, the photonic efficiency relating a number of photons of the optical beam detectable by the optical receiver, to a number of photons of the optical beam emitted by the optical transmitter, and wherein the method further comprises transmitting a heartbeat signal for orientation of the optical transmitter and optical receiver, the heartbeat signal being modulated to carry or indicate a location of the optical transmitter, or a signal to cause the optical receiver to return its location or an indication of its location to the optical transmitter.

* * * * *